United States Patent
Lundberg et al.

(10) Patent No.: US 10,296,273 B2
(45) Date of Patent: May 21, 2019

(54) BUILDING AN INFRASTRUCTURE OF ACTIONABLE ELEMENTS

(71) Applicant: Quad/Graphics, Inc., Sussex, WI (US)

(72) Inventors: Gary Lundberg, Milwaukee, WI (US); Matthew T. Kammerait, Mequon, WI (US); Monte Rose, Hartland, WI (US); William A. Bear, Roberts, WI (US)

(73) Assignee: Quad/Graphics, Inc., Sussex, WI (US)

( * ) Notice: Subject to any disclaimer, the term of this patent is extended or adjusted under 35 U.S.C. 154(b) by 333 days.

(21) Appl. No.: 14/693,125

(22) Filed: Apr. 22, 2015

(65) Prior Publication Data

US 2015/0301775 A1 Oct. 22, 2015

Related U.S. Application Data

(60) Division of application No. 13/849,234, filed on Mar. 22, 2013, now abandoned, which is a continuation of
(Continued)

(51) Int. Cl.
*G06F 3/12* (2006.01)
*H04L 29/08* (2006.01)
(Continued)

(52) U.S. Cl.
CPC .......... *G06F 3/1268* (2013.01); *G06F 3/1285* (2013.01); *G06F 16/113* (2019.01);
(Continued)

(58) Field of Classification Search
CPC ......................................... G06F 17/21–17/211
(Continued)

(56) References Cited

U.S. PATENT DOCUMENTS 6,144,848 A 11/2000 Walsh et al.
6,330,976 B1 12/2001 Dymetman et al.
(Continued)

FOREIGN PATENT DOCUMENTS

WO WO2000058804 10/2000
WO WO2000070585 11/2000

OTHER PUBLICATIONS

Nellymoser Companion Apps, printed from www.nellymoser.com/mobile-solutions/companion apps on Mar. 20, 2013 (2 pages).
(Continued)

*Primary Examiner* — Frank D Mills
(74) *Attorney, Agent, or Firm* — Becker Patent Law, LLC

(57) ABSTRACT

A computing system and method for delivering actionable elements related to a multi-page printed piece comprises a network interface circuit, a memory and a processing circuit. The memory is configured to store identifying information for a plurality of different multi-page printed pieces and associated actionable elements for each printed piece. The processing circuit is configured to receive via the network interface circuit a request for actionable elements for the multi-page printed piece, the request having input information. The processing circuit is further configured to compare the input information in the request to the identifying information stored in the memory, retrieve the actionable elements for different pages of the multi-page printed piece from the memory based on the comparison, and send the retrieved actionable elements via the network interface circuit.

6 Claims, 17 Drawing Sheets

Related U.S. Application Data application No. 13/843,670, filed on Mar. 15, 2013, now abandoned.

(60) Provisional application No. 61/642,750, filed on May 4, 2012.

(51) Int. Cl.
*G06F 16/11* (2019.01)
*H04W 4/80* (2018.01)
*G06F 17/22* (2006.01)
*H04W 4/02* (2018.01)

(52) U.S. Cl.
CPC .......... *H04L 67/10* (2013.01); *G06F 17/2235* (2013.01); *H04L 67/18* (2013.01); *H04L 67/306* (2013.01); *H04W 4/02* (2013.01); *H04W 4/80* (2018.02)

(58) Field of Classification Search
USPC ....................................................... 715/205
See application file for complete search history.

(56) References Cited

U.S. PATENT DOCUMENTS

| | | | |
|---|---|---|---|
| 6,577,861 B2 | 6/2003 | Ogasawara | |
| 6,655,586 B1 | 12/2003 | Back et al. | |
| 6,676,014 B2 | 1/2004 | Catan et al. | |
| 6,690,402 B1 | 2/2004 | Waller et al. | |
| 6,801,833 B2 | 10/2004 | Pintsov et al. | |
| 6,947,571 B1* | 9/2005 | Rhoads | G06Q 30/02 382/100 |
| 6,994,262 B1 | 2/2006 | Warther | |
| 7,178,718 B2 | 2/2007 | Silverbrook et al. | |
| 7,257,549 B2 | 8/2007 | Karaoguz et al. | |
| 7,599,844 B2 | 10/2009 | King et al. | |
| 7,739,150 B2 | 6/2010 | Bryant et al. | |
| 7,991,644 B2 | 8/2011 | Bryant et al. | |
| 8,315,914 B2 | 11/2012 | Bryant et al. | |
| 2001/0037252 A1* | 11/2001 | Kawakatsu | G06Q 30/02 705/26.41 |
| 2001/0038252 A1 | 11/2001 | Kawakatsu | |
| 2002/0083123 A1* | 6/2002 | Freedman | H04L 29/06 709/203 |
| 2004/0010446 A1 | 1/2004 | Vanska et al. | |
| 2004/0054627 A1 | 3/2004 | Rutledge | |
| 2004/0091842 A1* | 5/2004 | Carro | G09B 21/001 434/112 |
| 2004/0093274 A1 | 5/2004 | Vanska et al. | |
| 2004/0199867 A1* | 10/2004 | Brandenborg | G06Q 10/06 715/201 |
| 2004/0243519 A1 | 12/2004 | Perttila et al. | |
| 2005/0033657 A1* | 2/2005 | Herrington | G06F 17/30058 705/26.7 |
| 2005/0096938 A1* | 5/2005 | Slomkowski | G06F 21/34 705/51 |
| 2005/0213790 A1 | 9/2005 | Rhoads et al. | |
| 2005/0261990 A1* | 11/2005 | Gocht | G06Q 30/02 707/758 |
| 2006/0124742 A1* | 6/2006 | Rines | G06F 17/30879 235/462.01 |
| 2007/0050360 A1* | 3/2007 | Hull | G06F 17/3002 |
| 2007/0050411 A1* | 3/2007 | Hull | G06F 17/30047 |
| 2007/0143256 A1* | 6/2007 | Starr | G06Q 30/02 |
| 2007/0162350 A1* | 7/2007 | Friedman | G06F 17/30879 705/346 |
| 2007/0192872 A1* | 8/2007 | Rhoads | G06F 3/017 726/26 |
| 2007/0273644 A1* | 11/2007 | Mondine Natucci | G06T 19/006 345/156 |
| 2008/0003548 A1 | 1/2008 | Carro | |
| 2008/0014917 A1* | 1/2008 | Rhoads | G06F 3/017 455/422.1 |
| 2008/0151302 A1* | 6/2008 | Lee | B42C 1/00 358/1.16 |
| 2009/0067726 A1* | 3/2009 | Erol | G06F 17/30247 382/197 |
| 2009/0144164 A1* | 6/2009 | Wane | G06Q 20/10 705/17 |
| 2011/0035289 A1* | 2/2011 | King | G06Q 30/02 705/14.73 |
| 2011/0035662 A1* | 2/2011 | King | G06F 17/211 715/273 |
| 2011/0066658 A1 | 3/2011 | Rhoads et al. | |
| 2011/0072395 A1* | 3/2011 | King | G06F 17/241 715/825 |
| 2011/0116609 A1* | 5/2011 | Harvey | H04M 1/72522 379/88.04 |
| 2011/0145068 A1* | 6/2011 | King | G06F 17/211 705/14.55 |
| 2011/0216350 A1* | 9/2011 | Buckley | G06F 3/12 358/1.15 |
| 2011/0226850 A1* | 9/2011 | Ungos | G06F 3/002 235/375 |
| 2012/0088543 A1* | 4/2012 | Lindner | G06F 17/289 455/556.1 |
| 2012/0131140 A1* | 5/2012 | Rhoads | G06F 17/30867 709/217 |
| 2012/0197886 A1* | 8/2012 | Saitou | G06F 17/30879 707/736 |
| 2012/0246313 A1 | 9/2012 | Ho et al. | |
| 2012/0274987 A1 | 11/2012 | Lapstun et al. | |
| 2012/0278142 A1 | 11/2012 | Li | |
| 2013/0006772 A1 | 1/2013 | Silverbrook et al. | |
| 2013/0024470 A1* | 1/2013 | Gerwin | G06F 17/30876 707/769 |
| 2013/0036362 A1* | 2/2013 | Gerwin | G06F 17/212 715/738 |
| 2013/0066692 A1 | 3/2013 | Bryant et al. | |
| 2013/0073354 A1 | 3/2013 | Bryant et al. | |
| 2013/0113943 A1* | 5/2013 | Wormald | G06F 17/30253 348/207.1 |
| 2013/0147836 A1* | 6/2013 | Small | G06F 3/011 345/633 |
| 2013/0230178 A1* | 9/2013 | Gates | G06Q 30/02 381/56 |
| 2013/0259297 A1* | 10/2013 | Knudson | G06F 17/30244 382/103 |
| 2013/0260727 A1* | 10/2013 | Knudson | G06Q 30/00 455/414.1 |
| 2013/0311329 A1* | 11/2013 | Knudson | G06Q 50/01 705/26.9 |

OTHER PUBLICATIONS

Grace Ormonde Companion App Tutorial, printed from www.vimeo.com/57774385 on Mar. 20, 2013 (2 pages).
Gimbal, printed from www.gimbal.com on Mar. 20, 2013 (6 pages).
http__mobilesense.pdf, printed from www.candijar.com on Mar. 20, 2013 (1 page).
Candijar-tm-free-gr-code-scanner (and associated videos), printed from https://itunes.apple.com/us/app/candijar-tm-free-qr-code-scanner/id523043509?mt=8 on Mar. 20, 2013 (2 pages).
Mobiquitous, printed from http://www.tetherball360.com/mobiquitous.html on Mar. 20, 2013 (2 pages).
Wanderful-media-acquires-newsp, printed from http://techcrunch.com/2012/11/13/wanderful-media-acquires-newspaper-shoppings-adds-platform-icircular-from-the-ap/ on Mar. 20, 2013 (3 pages).
http__www.wanderful, printed from http://www.wanderful.com/ on Mar. 20, 2013 (1 page).
"Wanderful acquires AP's iCircular as media companies separate digital shopping from news," printed from http://www.poynter.org/latest-news/business-news/the-biz-blog/195035/wanderful-acquires-aps-icircular-as-media-companies-separate-digital-shopping-from-news/ on Mar. 20, 2013 (4 pages).

(56) References Cited

OTHER PUBLICATIONS

ICircular participating retailers, printed from http://info.icircular.com/retailers.html on Mar. 20, 2013 (1 page).

Download Shortcut Reader App. Shortcut—Interactive Print for Publishers and Advertisers, printed from shortcutmedia.com/download-shortcut-reader on Feb. 28, 2013 (3 pages).

Esquire to Make Print Magazine Interactive Through Netpage App—Digits—WSJ, printed from blogs.wsj.com/digits/2012/11/12/esquire-to-make-print-magazine-interactive-through-netpage-app/tab/print/ on Feb. 28, 2013 (2 pages).

Kooaba's new Shortcut app wants to kill QR codes in print advertising—The Next Web, printed from thenextweb.com/apps/2012/02/08/kooabas-new-shortcut-app-wants-to-kill-qr-codes-in-print-advertising/ on Feb. 28, 2012 (2 pages).

Reader's Digest Digital Editions | Reader's Digest, printed from www.rd.com/readers-digest-digital-editions/ on Feb. 28, 2012 (2 pages).

Ishikawa, Applying Audo-ID to the Japanese Publication Business, white paper, Oct. 1, 2003, auto-id center keio university, 5322 endo, fujisawa, kanagawa, 252-8520, japan.

\* cited by examiner

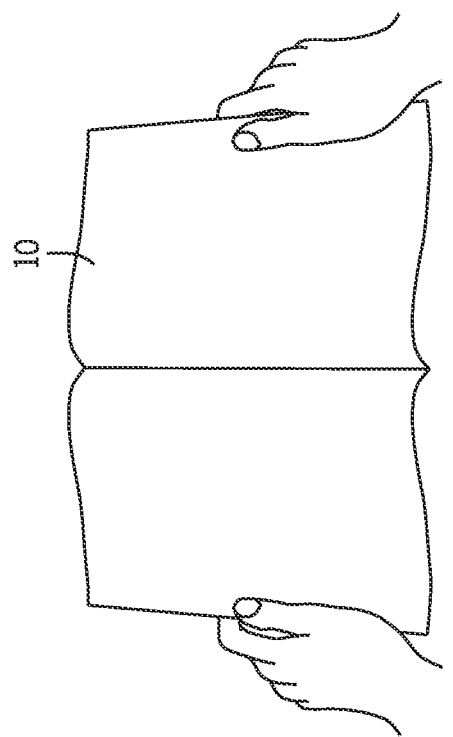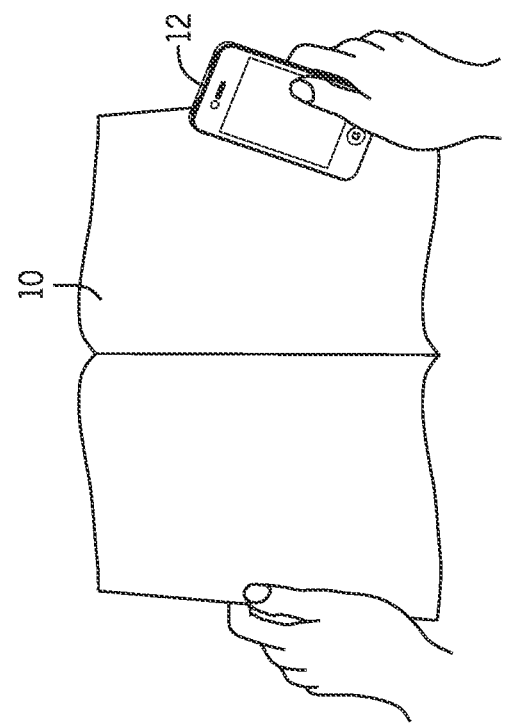
FIG. 1

DATABASE 118
    1. ELECTRONIC DOCUMENT – 200
        a. SIGNATURE 1 – 202
            i. SIGNATURE IMAGE – 204
            ii. SIGNATURE CONTENT 1 – 206
                1. IDENTIFICATION INFORMATION – 208
                2. CONTENT DETAIL INFORMATION – 210
                3. CONTENT VARIANTS – 212
                    a. REGIONAL – 214
                    b. SEGMENT – 216
            iii. SIGNATURE CONTENT 2 – 206
                1. CONTENT DETAIL INFORMATION – 210
            iv. SIGNATURE CONTENT 3 – 206
                1. IDENTIFICATION INFORMATION – 208
                2. CONTENT DETAIL INFORMATION – 210
                3. CONTENT VARIANTS – 212
                    a. REGIONAL – 214
            v. SIGNATURE CONTENT 4 – 206
        b. SIGNATURE 2 – 202
        c. SIGNATURE 3 – 202

FIG. 9

BUILDING AN INFRASTRUCTURE OF ACTIONABLE ELEMENTS

CROSS-REFERENCE TO RELATED APPLICATION

This application is a divisional of U.S. application Ser. No. 13/849,234, filed Mar. 22, 2013, which is a continuation of U.S. application Ser. No. 13/843,670, filed Mar. 15, 2013, both of which claim the benefit of U.S. Provisional Application No. 61/642,750, filed May 4, 2012, all three of which are incorporated herein by reference in their entireties.

BACKGROUND

This application generally relates to presenting actionable elements related to an object, such as a printed item, on a device. More particularly, this application relates to presenting electronic information related to the contents of a printed piece or item to facilitate use of or supplement the content of the printed piece.

Examples of printed publications include catalogs, magazines, newspapers, direct mail, retail inserts, signage, brochures, books, manuals, etc. Some embodiments may be used with printed pieces or items that are not publications. Some embodiments may be used with printed pieces such as single-page or single-surface printed pieces (as opposed to multi-page printed publications such as magazines, etc.), point of sale signage, outdoor signage (such as large signs displayed along a roadway), etc. Some printed publications are filled with URLs, phone numbers, email addresses, physical addresses, and other information that is not electronically accessible.

Computers, including smart phones and other types of electronic devices, are used as sources for information and entertainment. Electronic devices are being used to, for example, manage a user's schedules, display streaming video for entertainment and informational purposes, provide audio entertainment, display web pages, and display electronic books.

Computers can display printed text and images in increasingly high resolution and can also provide advanced functionality associated with the text and images. The advanced functionality associated with printed text and images can include providing word definitions, providing links to related information, allowing bookmarking of information, etc. For example, a person reading an electronic book can select an unfamiliar word and request a definition of that word. The computer displaying the electronic book can display a definition of the word from a locally stored database or using an external information source, such as the Internet.

SUMMARY

A computing device, method and system is disclosed for displaying actionable elements related to a multi-page printed piece. The device includes an input device, a transceiver circuit and a processing circuit. The input device is configured to receive input data which identifies the multi-page printed piece. The transceiver circuit is configured to transmit a request for data based on the received input data and to receive response data. The processing circuit is configured to generate, based on the response data, actionable elements for each of a plurality of different pages in the multi-page printed piece for display, the actionable elements being selectable by a user to interact with the additional content related to the selected actionable element.

A computing system and method for delivering actionable elements related to a multi-page printed piece comprises a network interface circuit, a memory and a processing circuit. The memory is configured to store identifying information for a plurality of different multi-page printed pieces and associated actionable elements for each printed piece. The processing circuit is configured to receive via the network interface circuit a request for actionable elements for the multi-page printed piece, the request having input information. The processing circuit is further configured to compare the input information in the request to the identifying information stored in the memory, retrieve the actionable elements for different pages of the multi-page printed piece from the memory based on the comparison, and send the retrieved actionable elements via the network interface circuit.

BRIEF DESCRIPTION OF THE DRAWINGS

Exemplary embodiments are illustrated in the accompanying drawings in which like reference numerals represent like parts throughout.

FIGS. 1 and 1A are illustrations of a print experience, showing the use of an electronic device together with a printed piece, according to one illustrative embodiment;

FIG. 9 is an illustration of a data structure stored in a memory implementing a publication information database, the data structure configured to include an electronic document related to a printed publication, and associated content, according to an illustrative embodiment;

Figure 1A:
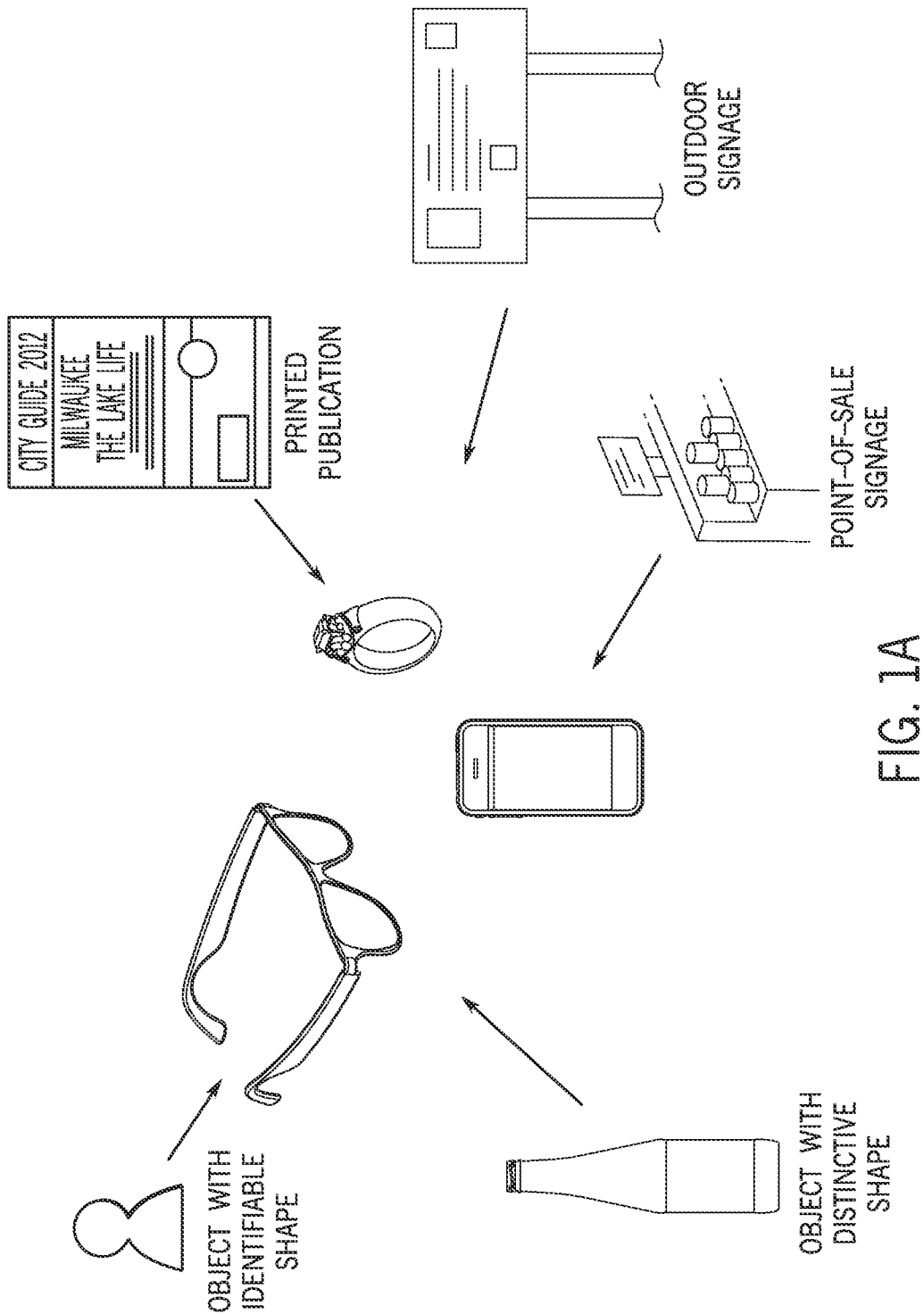

Before the embodiments are described in detail, it is to be understood that the systems and methods are not limited in their applications to the details of construction and the arrangement of components set forth in the following description or illustrated in the drawings. These are only illustrative embodiments, and the systems and methods described herein are capable of being implemented in other embodiments and of being practiced in various ways.

DETAILED DESCRIPTION OF ILLUSTRATIVE EMBODIMENTS

Some embodiments herein allow electronic devices to be utilized in combination with printed pieces and physical objects to provide a number of benefits that are not realized by the printed piece or object alone.

Some embodiments herein provide amore convenient method of obtaining additional information about a multi-page printed piece by using a device to discover the piece once and, in response, receiving additional information and/or actionable elements for one or more than one pages in the piece In some embodiments, the additional information and/or actionable elements may be obtained without requiring a user to individually discover each portion or page of a multi-page piece.

Some embodiments allow a user to more easily obtain supplemental content for a printed piece or physical object without having to identify which pages of a piece or portions of an object have actionable elements and which do not, as well as allow the user to engage between the piece or object and the related digital information together Some embodiments allow users, such as printers, publishers, advertisers, and others, to make supplemental content for a printed piece or object available without the need for extensive education of end users.

Some embodiments make the process of building a database of actionable elements for a printed piece or object easier, since fewer discovery mechanisms may be required and fewer steps are required to obtain content.

Some embodiments may provide less intrusion on pages of a printed piece in the form of QR codes or special imaging features needed for discovery, or the need to have such intrusions on every page or portion of a page where additional information or actionable elements are desired.

Some embodiments may provide a launch point to provide an end user with a display of or access to supplemental content, actionable elements or additional information for a complete printed piece or a group of related pages or content within a piece, or all pages related to a particular image or launch point, without having to individually take an image of multiple launch points associated with multiple distinct pieces of content.

Some embodiments may also provide an easier method of producing an interactive experience by using or tying a single launch point to a complete printed piece or group of related pages within a printed piece, such method taking into account versioning and page structure.

Some embodiments may allow brand owners, advertisers and/or publishers of printed materials and objects to provide hyperlinks to a deeper page of a web site than would be printed in the printed version of the materials or available on the object itself.

Referring now to FIG. 1, an illustration of a print experience is shown. In this embodiment, a printed piece 10 (in this example a printed publication) is shown being read by a user. The same printed publication 10 may be read in print form alongside a mobile computing device 12 implementing one or more features described herein.

Printed publication 10 may comprise content (e.g., text, images, editorials, advertisements, graphical content, etc.) printed on a physical, tangible, medium, such as paper, and published to a distribution of recipients, sometimes on a periodical basis. Printed publication 10 may be a multi-page publication. Examples of printed publications include catalogs, magazines, newspapers, direct mail, retail inserts, signage, brochures, books, manuals, etc. Some embodiments may be used with printed pieces or items that are not publications. Some embodiments may be used with printed pieces such as single-page or single-surface printed pieces (as opposed to multi-page printed publications such as magazines, etc.), point of sale signage, indoor or outdoor signage (such as large signs displayed along a roadway), etc.

For a publication printed in different versions, the versions may be based on one or any combination of segmented data based on characteristics, needs and preferences of the end user of the printed publication.

Mobile computing device 12 may be any of a variety of different types of computing systems that are designed to be used portably. Some are hand-held devices, such as a smartphone or a wrist-wearable computer, since they are configured to be used while being held in a person's hand. Some are not hand-held, but nevertheless mobile, such as laptop computers, wearable glasses, etc. In other embodiments, non-mobile computing systems may be used, such as a desktop computer, television, connected TV, smart TV, monitor, etc.

Although system 110 is described with reference to atypical computing system, it should be understood that the system and method described herein could be implemented in a variety of ways. One such example could be wearable glasses including an integral display and processor for implementing the functionality described herein.

In this embodiment, mobile computing device 12 is configured to run a computer application that may be downloaded to the device. The computer application can facilitate the functions described herein of discovering printed publication 10, retrieving actionable elements or other supplemental content, displaying actionable content, etc.

Figure 2:
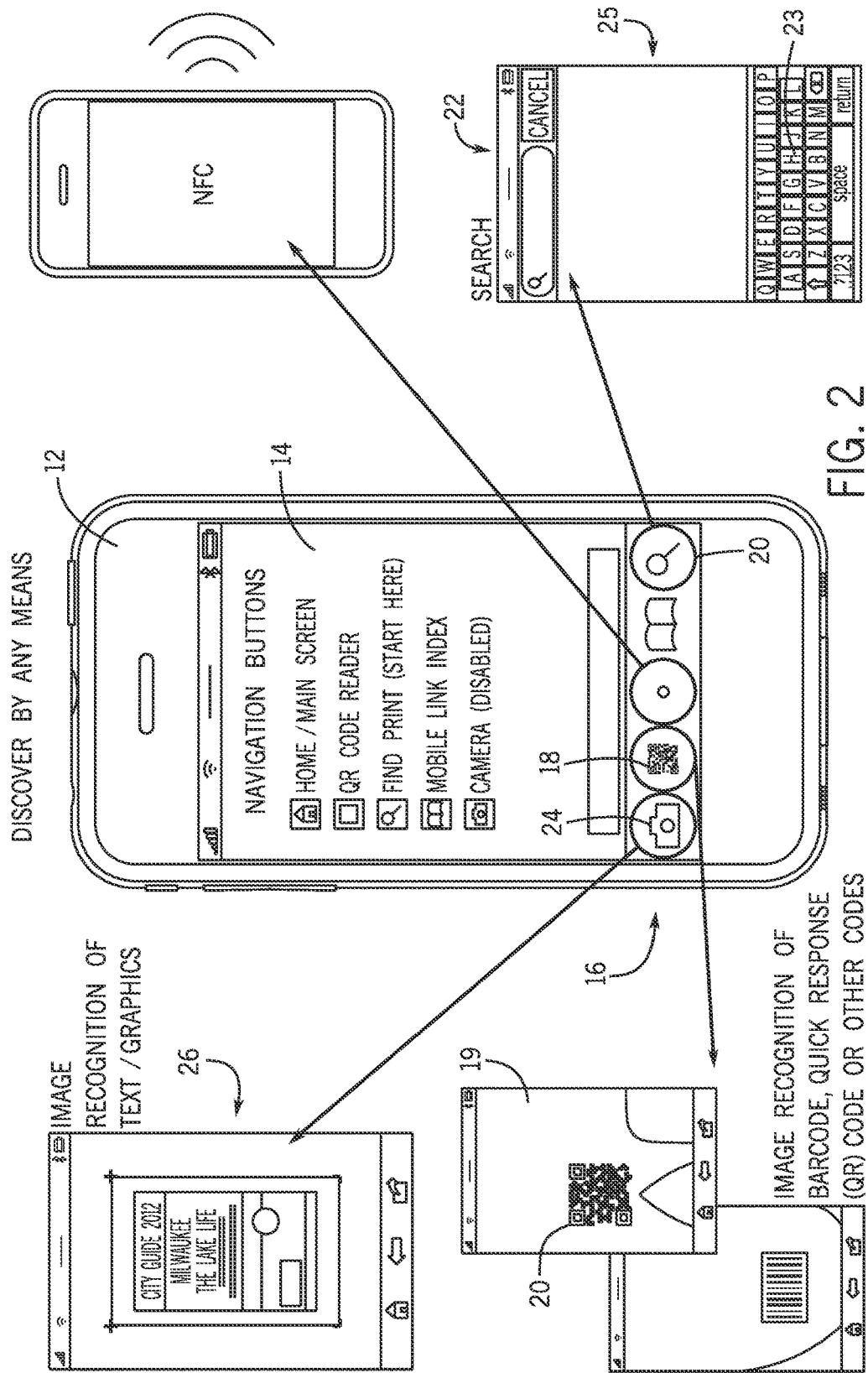
FIG. 2 is an illustration of various discovery mechanisms that may be used in different embodiments.

Referring now to FIG. 2, some discovery mechanisms that may be used in different embodiments are illustrated. In some embodiments, a discovery mechanism for a printed item may be used to identify the printed publication using an internet-enabled smartphone or tablet device to prompt the device to display or otherwise provide access to additional web-enabled content, which may comprise audio/visual content, audio content without visual content, haptic feedback, or other content. Mobile computing device 12 may operate a computer application configured to provide a publication identification home screen 14 on a display device to a user having a plurality of selectable options 16 for activating different discovery mechanisms.

A Quick Response (QR) code or other 2D bar code may be used as a launch point on some publications. Device 12 may provide bar code input button 18 on the display (or alternatively, an application or other program may be configured to automatically recognize, for example without requiring user input or selection, a bar code or other image element). In response to selection of bar code input button 18, a camera on device 12 may be activated with the image received at the camera shown on display 14. Based upon selection of the barcode recognition function icon 18, device 12 may be configured to display a barcode recognition screen 19 displaying a digital image captured by an integrated camera of device 12. Home screen 19 may be configured to provide instructions to the user regarding framing of the barcode, to assist in recognition of the barcode. The user may place the camera over a QR code 20, and device 12 may automatically (i.e., without requiring further user input), or in response to user input, acquire an image of the QR code and thereby read the code.

In another embodiment, a wireless ID tag, such as a Near Field Communication (NFC) device or other Radio Frequency Identification (RFID) device, may be used as part of a discovery mechanism. Device 12 may be brought near a printed item close enough to allow the transfer of an ID code to device 12. Device 12 may have an integrated read that can continuously scan for the presence of such codes, in a manner that little or no user input is required to accomplish the discovery.

In another embodiment, a textual search function may be used for discovery. Based on selection of the manual entry function icon 20, device 12 may be configured to display a searching screen 22 including a virtual keyboard 23 configured to allow a user to manually enter one or more keywords intended to help identify a particular printed publication. The user can provide information about the printed publication and/or content provided therein such as title, article name, date, image information, or other publication or content information. Screen 22 may be configured to display a listing of identified printed publications in an information section 25 based upon keywords entered by the user. In response to selection of a textual search input button or icon 20, a search screen 22 may be shown allowing the user to type in a search query to find the printed piece.

In another embodiment, an image recognition function may be used for discovery. The user may select an image recognition input button or icon 24. In response to this selection, device 12 may be configured to display on image recognition home screen 14 a digital image captured by an integrated camera of device 12. Home screen 310 may be configured to include instructions to the user for capturing an image using device 12. The user captures an image of all or a portion of a page of the printed item, such as a cover of a printed publication, as shown at 26. Device 12 may use points in the image to identify the printed item, with processing handled either locally on device 12 or remotely at a server computer.

As shown, the discovery may be made through interaction with a launch point on the printed publication, such as a QR code, other bar code, NFC tag, or portion of an image, or by a user typing in a search query for the publication, or by a user scanning an image of a shape or sculptural aspect of an object. Other discovery techniques may be implemented.

A software application installed on the user's device can read the launch point and direct an internet browser or other application installed on the device to a specific URL or augmentation information associated with, or included in the launch point of the printed piece, as will be described in greater detail below. Alternatively, upon reading the launch point, the software application may open or launch other software applications for alternative uses.

In one embodiment, a single input data or code obtained from a multi-page printed item may be used by device 12 to obtain actionable elements for a plurality of different pages, without requiring a user to scan each page of the multi-page printed item.

Content displayed as a result of reading the launch point may relate to an object associated with the launch point. For example, where the displayed content is tied to an advertisement, scanning the launch point may display a web page directed to a product, a brand, an article or other editorial content that is directly associated with the launch point, as will be described in greater detail below.

Another discovery mechanism can be an algorithm that deduces, predicts, or determines an edition of a printed publication for which a user will want actionable elements. For example, if a user discovers the February edition of a magazine, the system can suspect that the user will want the March edition of the same magazine. Further, the system can automatically submit supplemental data for the March edition to a screen such as that shown in FIG. 3; and this submission may occur prior to the printed version is shipped, or based on information about the known ship date, the actual date that the printed version is scheduled to arrive at the user's home.

Figure 3:
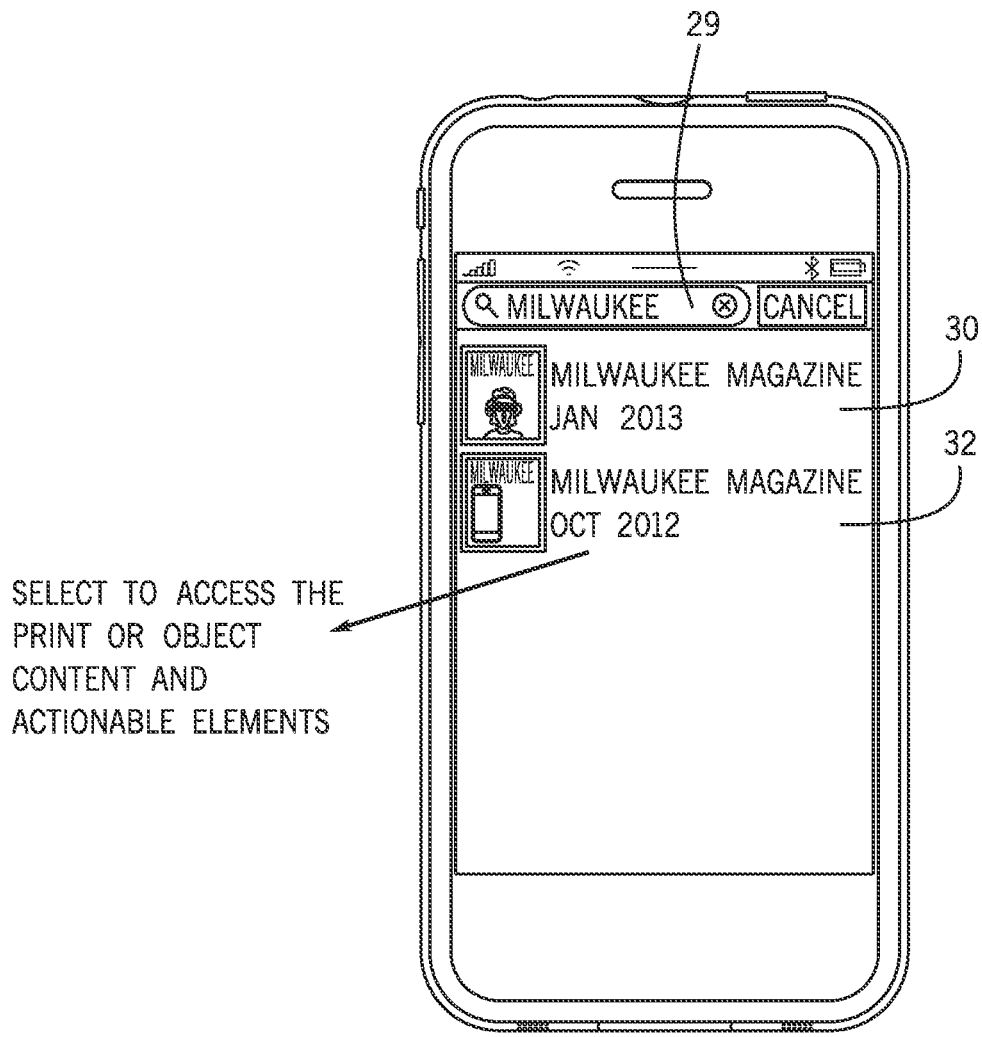
FIG. 3 is a screen shot of a menu showing a plurality of different printed pieces, according to one illustrative embodiment.

FIG. 3 is a screen shot of a menu showing a plurality of different printed pieces, according to one illustrative embodiment. In response to a textual search query or a code received from a launch point, device 12 may be configured to search for publications that match the query. The search may be done locally on device 12, for example in a list of previously-stored "favorites" or known subscriptions the user has to printed publications, and/or the search may be done on a remote server computer against tens, thousands, or more printed publications. Device 12 may generate display data representing a plurality of different multi-page printed pieces 30, 32 for simultaneous display on a single screen.

In this example, a user has typed "Milwaukee" into a search field 29. Device 12 has searched a remote database of potential matches by title of publication, and two results are shown: "Milwaukee Magazine January 2012" 30 and "Milwaukee Magazine October 2012" 32. A thumbnail image of a front cover of the magazine may be displayed in an active area of the screen, to allow a user to press the screen to select actionable elements for the selected publication. The thumbnail image may have a smaller file size than a full-size image of the page stored on a remote server. In response to selection of one of the multi-page printed pieces being simultaneously displayed, a plurality of actionable elements for the selected piece may be displayed.

Figure 4:
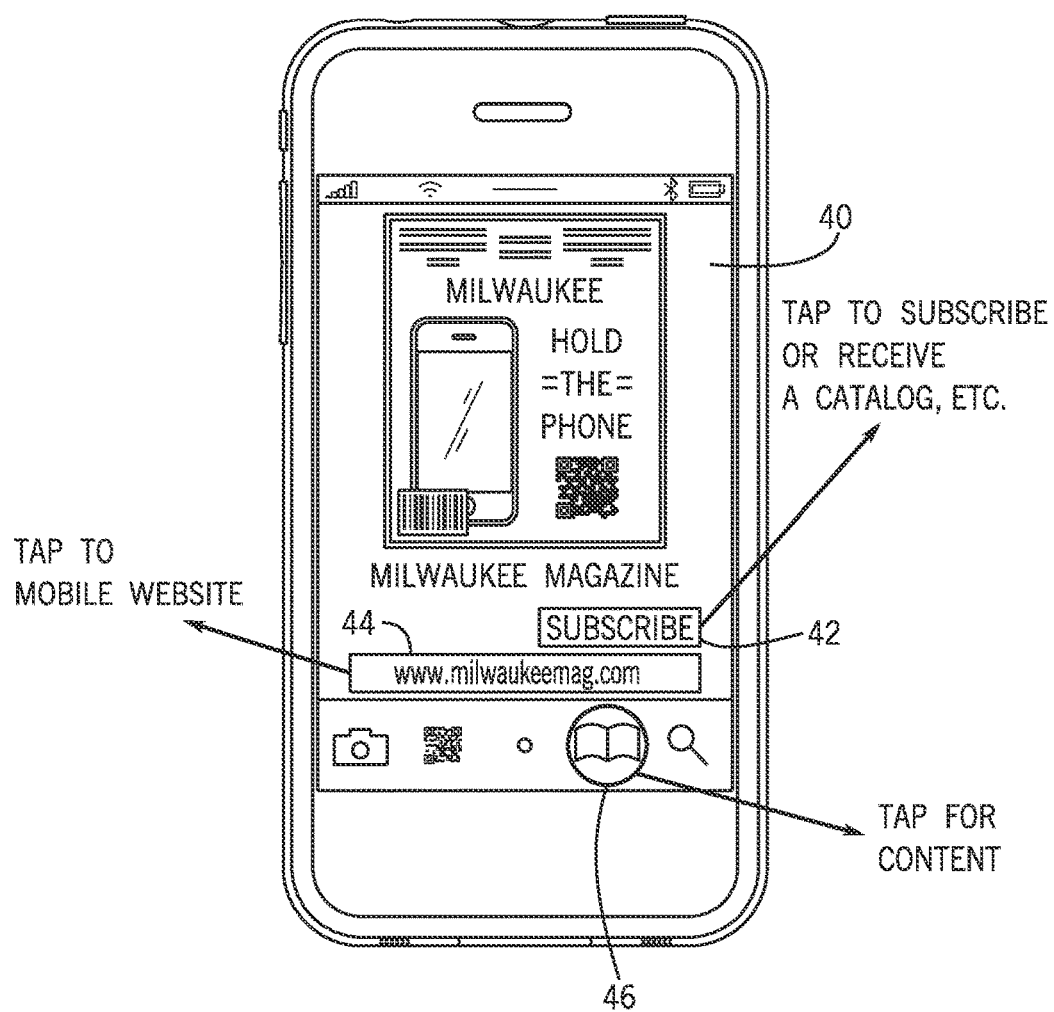
FIG. 4 is a screen shot of a title screen of one printed piece and an actionable element in the form of a hyperlink, a subscribe button, a search function and an open for content function, according to one illustrative embodiment.

FIG. 4 is a screen shot of a title screen of one printed piece and an actionable element in the form of a hyperlink, a subscribe button, a search function and an open for content function, according to one illustrative embodiment. In this embodiment, selection of one of publications 30 and 32 (FIG. 3) leads to a title screen 40 illustrating a larger thumbnail image of the printed publication. Title screen 40 may provide additional actionable or convenient items, such as a subscribe button 42, which can be touched or tapped to take the user to a subscription page configured to sign the user up for a subscription (for example, by taking suitable delivery address, payment information, etc.) A website input button 44 may be provided, which can be tapped to take the user to a desired website, for example, using a browser application operating on device 12.

An input button 46 may be tapped to display additional actionable elements. The actionable elements may be downloaded to device 12 prior to the tap or in response to the tap.

Figure 5:
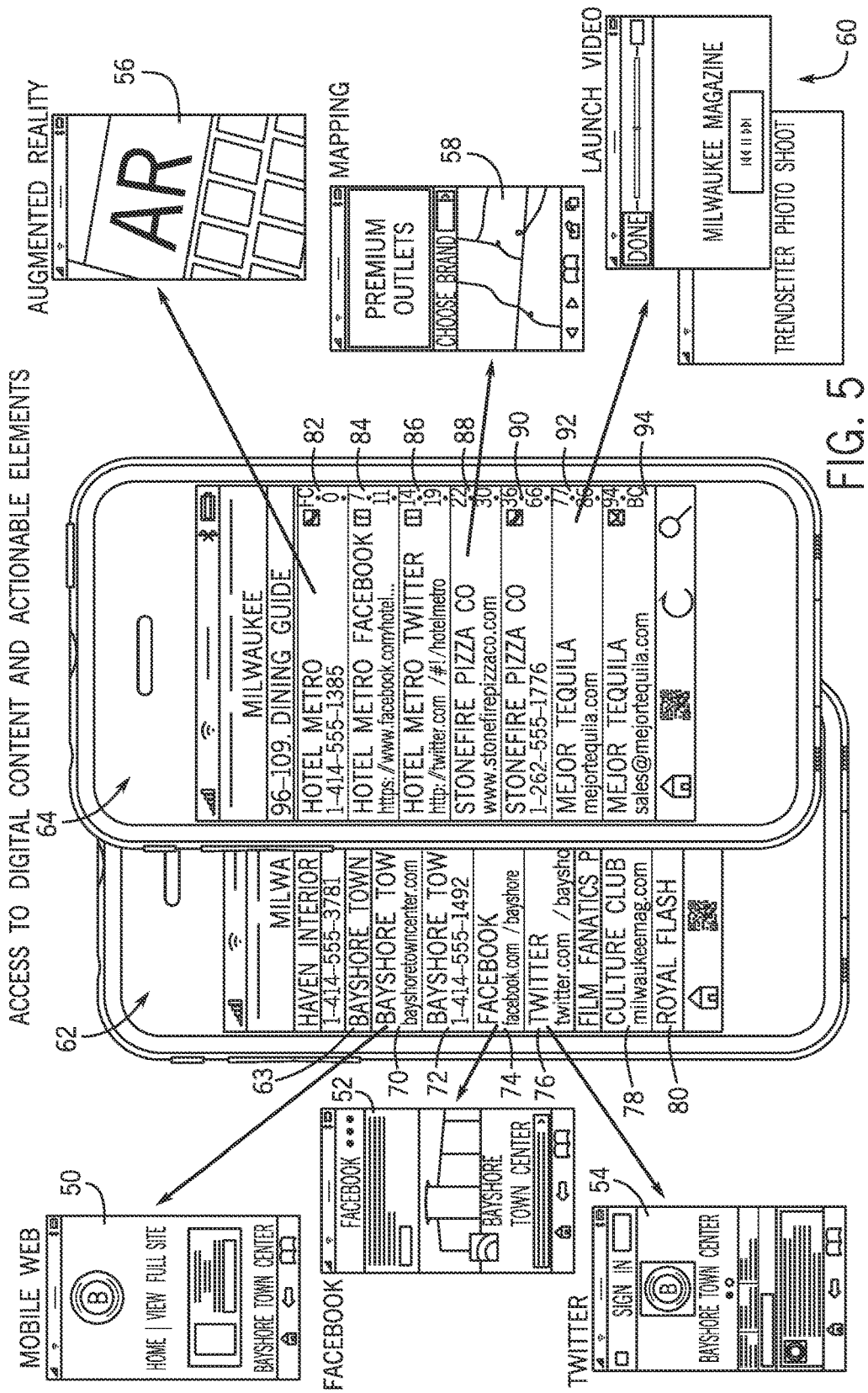
FIG. 5 is a flow diagram of illustrative actionable elements and illustrative actions that may occur in response to selection of the actionable elements.

FIG. 5 is a flow diagram of illustrative actionable elements and illustrative actions that may occur in response to selection of the actionable elements. Device 12 may be configured to present supplemental publication information using a plurality of publication information screens 50-60 is shown. Although screens 50-60 are shown by way of example, the display screen can provide the functionality described herein in many alternative ways.

An actionable element home screen 62 or 64 can be displayed on device 12 based upon the publication ID code or data received as described above with reference FIGS. 2-4. The information displayed on home screen 62 or 64 may be related to information in the physical printed publication 10 (FIG. 1). Advantageously, home screens 62, 64 display a plurality of actionable elements and/or other descriptive information in a related group of content, In this embodiment, home screen 62, 64 may provide the end user with a display of or access to all actionable items for a complete printed publication, or a group of related pages within a printed publication, or all pages related to a particular image or launch point, without having to individually take an image of every page or barcode or tag.

Device 12 is configured to receive data from local memory or a remote server in response to the ID code discovered for the printed publication. From this received response data (e.g., hyperlinks, text data, phone numbers, etc.), device 12 generates actionable elements 70-94. In the illustrated embodiment, actionable elements are generated for each of a plurality of different pages in the multi-page printed piece for display on screens 62, 64. An actionable element is an element provided by device 12 which is selectable by a user to retrieve and/or display additional content related to the selected actionable element.

For example, actionable element 70 is a field of screen 62 comprising a hyperlink to www.bayshoretowncenter.com, an active area of the screen acting as a user input device, and a textual display of the element, namely "Bayshore Town Center." In response to selection of the actionable element, a mobile web browser is launched to display the web site referenced in the hyperlink, as shown by screen 50.

As another example, actionable elements 74 and 76 direct a user to social media applications operating on device 12 referenced to Bayshore Town Center, for Facebook and Twitter, respectively.

As another example, an actionable element may be selected by a user to provide an augmented reality experience with respect to a corresponding page in the printed publication. For example, a 3-D image, video, or other content may be overlaid on an image of the printed page, as shown by screen 56. The augmented reality content may be downloaded in response to selection of the actionable element, or may be downloaded prior to selection of the actionable element. The augmented reality content may be anchored to or aligned with the image taken by the mobile device, or it may be not anchored to the image.

As another example, an actionable element 88 may comprise a hyperlink to a mapping application configured to show a map of the location of the retail store referenced in the actionable element, as shown by screen 58.

As another example, an actionable element 90 is a phone call element. In response to selection of this element, device 12 launches a phone application and dials the phone number displayed in element 90. The phone call may be implemented with a single touch of element 90, or with a touch-and-confirm method after displaying the phone number within the phone application.

As another example, an actionable element 92 may comprise a hyperlink or other reference to launch video content related to the page or printed content of the printed publication referenced by the actionable element 92, as shown by screen 60.

A user, using device 12, can select any information being displayed on the information screens 62, 64 to display information detail screens 50-60, Information detail screens 50-60 may be used to launch web pages, display additional images, display rich media content, display additional information, and implement additional functionality such as mapping, making reservations, etc.

Screens 62 and 64 are merely illustrative. In one embodiment, the screen is configured to display actionable elements for a plurality of different pages of a multi-page publication simultaneously on a single screen on the display. The single screen may be scrollable to reveal additional information on the screen. For example, screens 62 and 64 may be different portions of single screen.

The actionable elements may be arranged for display based on page numbers of the multi-page printed piece relating to each of the actionable elements. For example, screen 62 shows "p10" in a header bear 63, indicating that the actionable elements 70-76 all relate to content on page 10 of the physical printed publication corresponding to the actionable elements. In this embodiment, the actionable elements are arranged from top to bottom of the screen in the order that their corresponding printed content appears in the printed publication. This arrangement provides a view in ways like a "table of contents" in that it is arranged by page number. Alternatively, the contents may be arranged topically or in any other logical order, such as chronologically, etc. This arrangement may allow a user to easily locate the actionable elements for pages being viewed by the user in the physical copy of the printed publication (as in FIG. 1).

Figure 6:
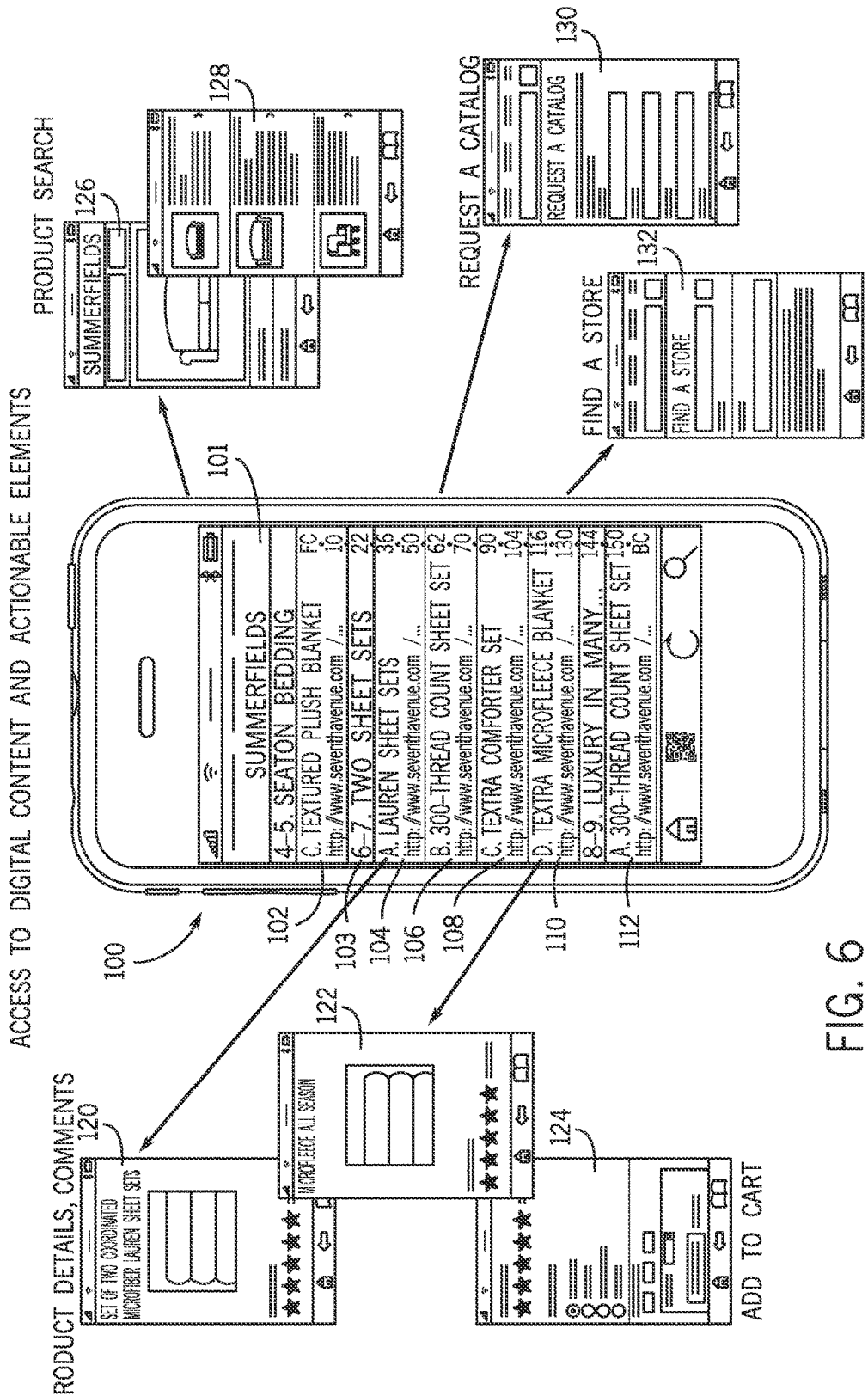
FIG. 6 is a flow diagram of illustrative actionable elements and illustrative actions that may occur in response to selection of the actionable elements.

FIG. 6 is a flow diagram of illustrative actionable elements and illustrative actions that may occur in response to selection of the actionable elements. Actionable elements 102-112 are displayed on screen 100. As one example, in response to selection of element 104, details of a product shown on the page of the printed publication e.g., a product sales catalog) may be shown, such as price, customer ratings, pictures, etc. The element may comprise an indicator, such as a letter, or number, to assist the user in correlating the actionable element to a product shown in the printed publication at the page referenced by the page header 103. From screen 120 or 122, or from another actionable element on screen 100, a user may "add to cart" or complete additional steps in the purchasing of the product being viewed, resulting in screen 124 (e.g., a shopping cart or payment/shipping screen).

As another example, selection of a marquee advertising actionable element 101 may bring the user to a product search mobile website page, as shown at screen 126. The user may then search by keyword or product number to obtain a listing of products available from that advertiser, as shown in screen 128.

As another example, an actionable element may be selected to request a paper catalog, as shown by screen 130. For example, a user may have discovered the publication using a text search without having or owning a printed copy of the catalog. In this case, the user is viewing the actionable elements without the printed copy of the publication in hand. In this scenario, or others, the user may be presented with a "request a catalog" actionable element to direct a user to a screen that will receive the user's address, phone, or other information needed to ship a paper copy of a catalog to the user's physical address.

As another example, an actionable element may be selected to "find a store", as shown by screen 132. As another example, an actionable element may be selected to "buy now" a particular product.

Figure 7:
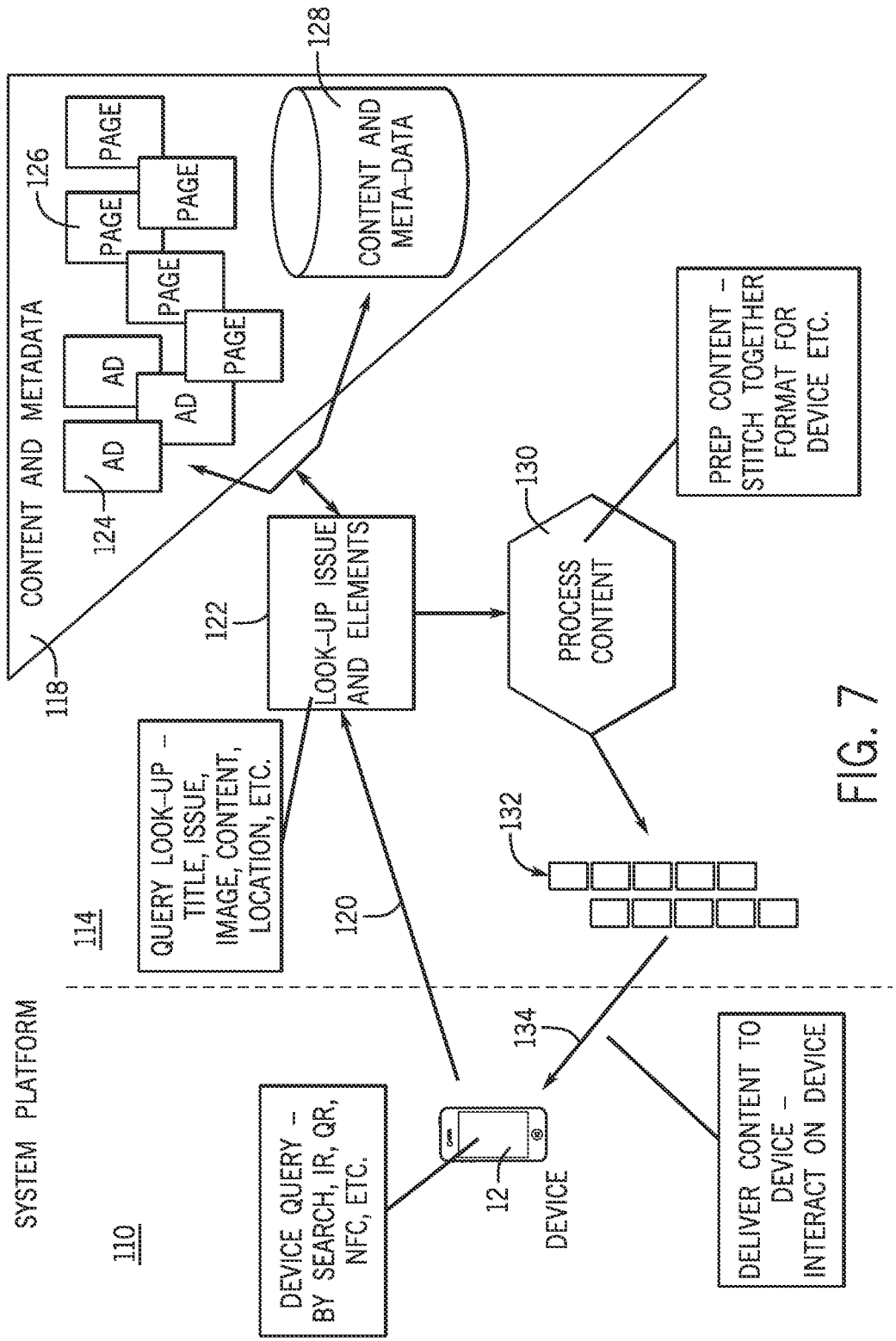
FIG. 7 is a flow diagram of a system for processing requests for actionable elements, according to one illustrative embodiment.

FIG. 7 is a flow diagram of a system for processing requests for actionable elements, according to an illustrative embodiment. On a device side 110, device 12 may comprise an input device (such as a camera, text search box, wireless transceiver, microphone, etc) configured to receive input data which identifies the multiage printed piece. Device 12 may comprise a wired or wireless transceiver circuit (e.g., a Wi-Fi circuit, an Ethernet circuit, a cellular data circuit, etc.) configured to transmit a request for data based on the received input data and to receive response data. A processing circuit within device 12 is configured to implement the functions described herein.

On a server side, 114, a server computer (e.g., comprising one or more physical computing systems, a cloud computer, etc.) is configured to deliver actionable elements to device 12. Server computer may comprise one or more functional circuit modules (e.g., programmed portions of a processing circuit) and a network interface circuit, which may comprise any suitable electrical circuit and associated components for communicating with a network, such as the Internet.

Server side may also comprise a memory 118, which may comprise one or more databases. Database 118 may be a repository of information including electronic documents and other content associated with one or more printed publications. Electronic documents may comprise a complete image of a printed piece or digital elements related to or associated with the printed piece. In an alternative embodiment, one or more portions of the information and/or functionality of database 118 may be stored locally on device 12.

Associated content in database 118 associated with the content in the printed publication can further include information about attributes such as page number, layout, location, orientation, image and/or product information such as SKU, date, digital rights management, author, owner, caption, color, shape, links storyline, and transaction information such as price, size, UPC, shipping and other types of information. Moreover, extra or associated data feeds related to the content may be associated with the content. These data feeds may be in the form of text, image, video, and may be associated with a digital address such as a URI Web and file links may further be associated with any of the content. The content associated with the data feeds can be promotional or informational.

Database 118 may define a lightweight content structure, which serves as an outline, or a skeleton, for each final print media version, distributed. This database may include all of the print version parameters such as title, date, number of pages, location destination, etc. The content outline is also a container structure from which to digitally distribute print media augmentation or supplemental content (e.g., actionable elements) as well as print reference or look-up information such as images, pages, watermarks, embedded codes, keywords, etc. Database 118 can further include information about attributes such as page number, layout, location, orientation, image information such as SKU, date, digital rights management, author, owner, caption, color, links storyline, and transaction information such as price, size, UPC, shipping and other types of information. Moreover, extra or associated data feeds related to the content may be associated with the content. These data feeds may be in the form of text, image, video, and are generally associated with a digital address such as a URL. Web and file links may further be associated with any of the content. The content associated with the data feeds can be promotional or informational. The content and associated information can be stored on a memory in a dedicated server or cloud environment.

In one embodiment, database 118 may contain files suitable for use by a printing press (e.g., a digital laser printing press, a web offset printing press, a gravure printing press, or other presses) for large-scale commercial printing. Such printing presses may have multi-color print towers (e.g., cyan, yellow, magenta, black), plates, blankets, and other features of large-scale commercial printing presses. In such an embodiment, database 118 may serve data to both printing presses and to mobile devices. For example, full images may be printed by the printing presses, and something less than full images, such as actionable elements and/or thumbnails having smaller files sizes may be served to mobile devices for use with the printed publication.

The actionable elements may correspond to printed text in the multi-page printed piece, wherein the actionable elements are displayed in a format different than a format of the printed text. For example, a page of a magazine may have an image of an advertisement comprising a textual portion listing a web site address. The corresponding, related actionable element may comprise the textual portion comprising the web site without the full corresponding image. Advantageously, actionable elements may provide additional information or features that need not be published in the print version of the publication, such as a link to a web page deeper within a web site.

An infrastructure implemented on server side 114 may provide access to content of a printed publication to an end-user on an end-user device.

The infrastructure may receive a request in relation to the printed publication via request 120. A module 122 may look up the issue of the publication and the actionable elements by searching database 118. The request may be compared with identifying information (e.g., IDs, codes, data, etc.) associated with the content in database 118. Database 118 may comprise advertisements 124, images of pages in the printed publication, and/or metadata indexed by title and/or issue 128.

At a module 130, the infrastructure is configured to process the data from database 118 for transmission to device 12. For example, the actionable elements may be stitched together or otherwise combined into a file, arranged or organized by page number, formatted for device 12 based on the type of device (e.g., operating system, browser type, device capabilities, display size, wireless data connection type, etc.), and/or other information contained in the request or other otherwise processed. This results in data organized in a framework corresponding to the printed pages of the printed publication, as illustrated at framework 132. The processed content associated with the printed publication may be provided to the end-user device via response data 134.

Implementations are not limited to the structures or functions illustrated in FIG. 7. For example, device 12 may provide some of the functionality of module 130 to format the response data for display as actionable elements, Actionable elements may be generated at device 12 based. on processing steps occurring on device 12, module 130, and/or other portions of the system.

Figure 8A:
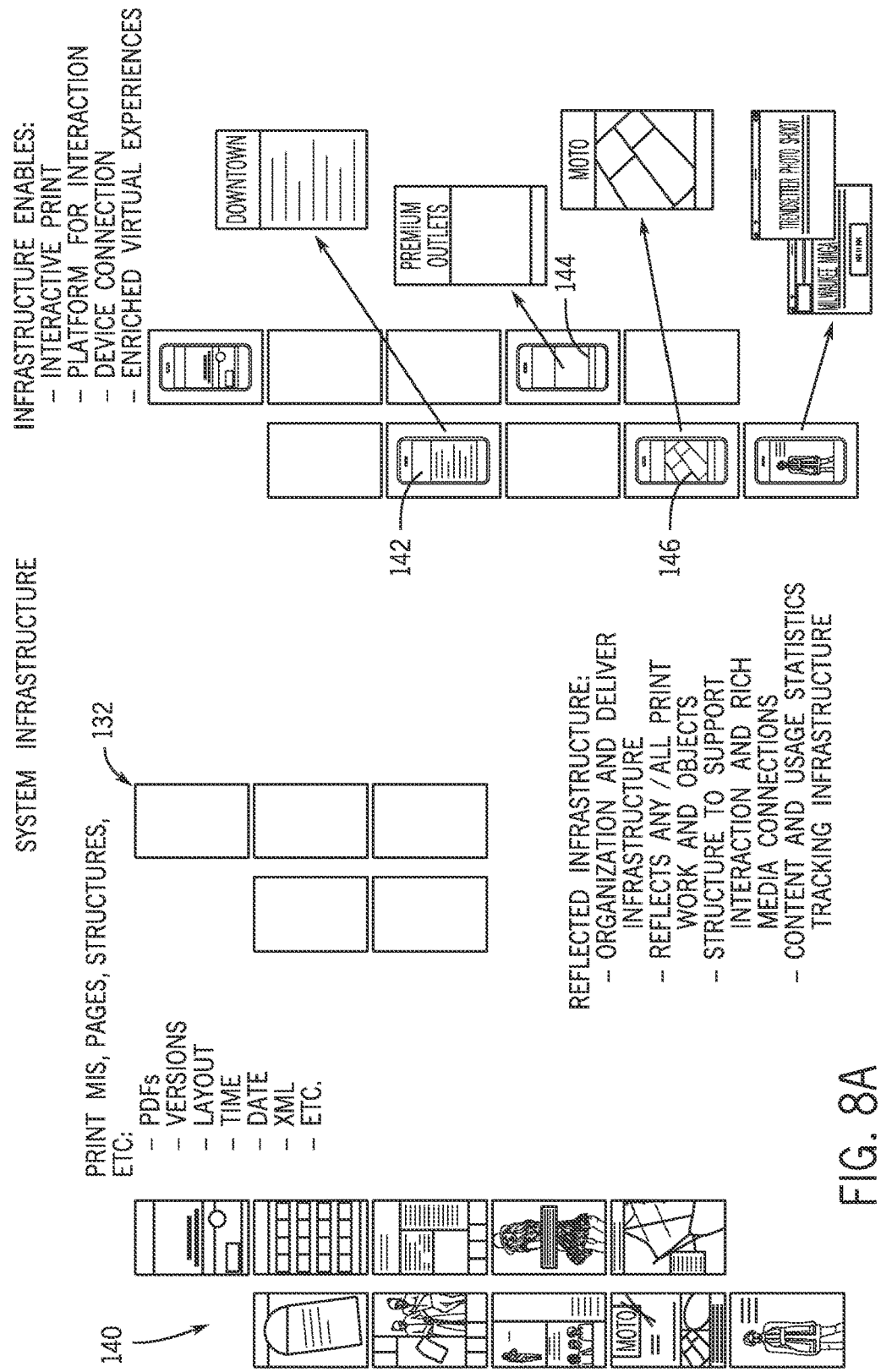
FIG. 8A is a flow diagram of a system illustrating an infrastructure for processing requests for actionable elements, according to one illustrative embodiment.

FIG. 8A is a flow diagram of a system illustrating an infrastructure for processing requests for actionable elements, according to one illustrative embodiment. In this flow diagram, pages of a printed publication 140 are shown. In one example, the digital data files for the pages may be available at a printing operator, and may include .pdfs or other image files of the actual pages to be printed, version data for different versions of the publication, management information system (MIS) information for the publication, time/date of printing, .xml files, and other data.

The server side computing system may be programmed to create the mobile application infrastructure or framework which may reflect all print work, be structured to support mobile interaction and rich media connections to print, and/or provide content and statistics analytics. A framework 132 comprises data generated by the server side computing system representing the layout by page of the printed publication. Actionable elements 142, 144, 146, etc. may be associated with certain page of the printed publication, based on related information printed on the page.

Figure 8B:
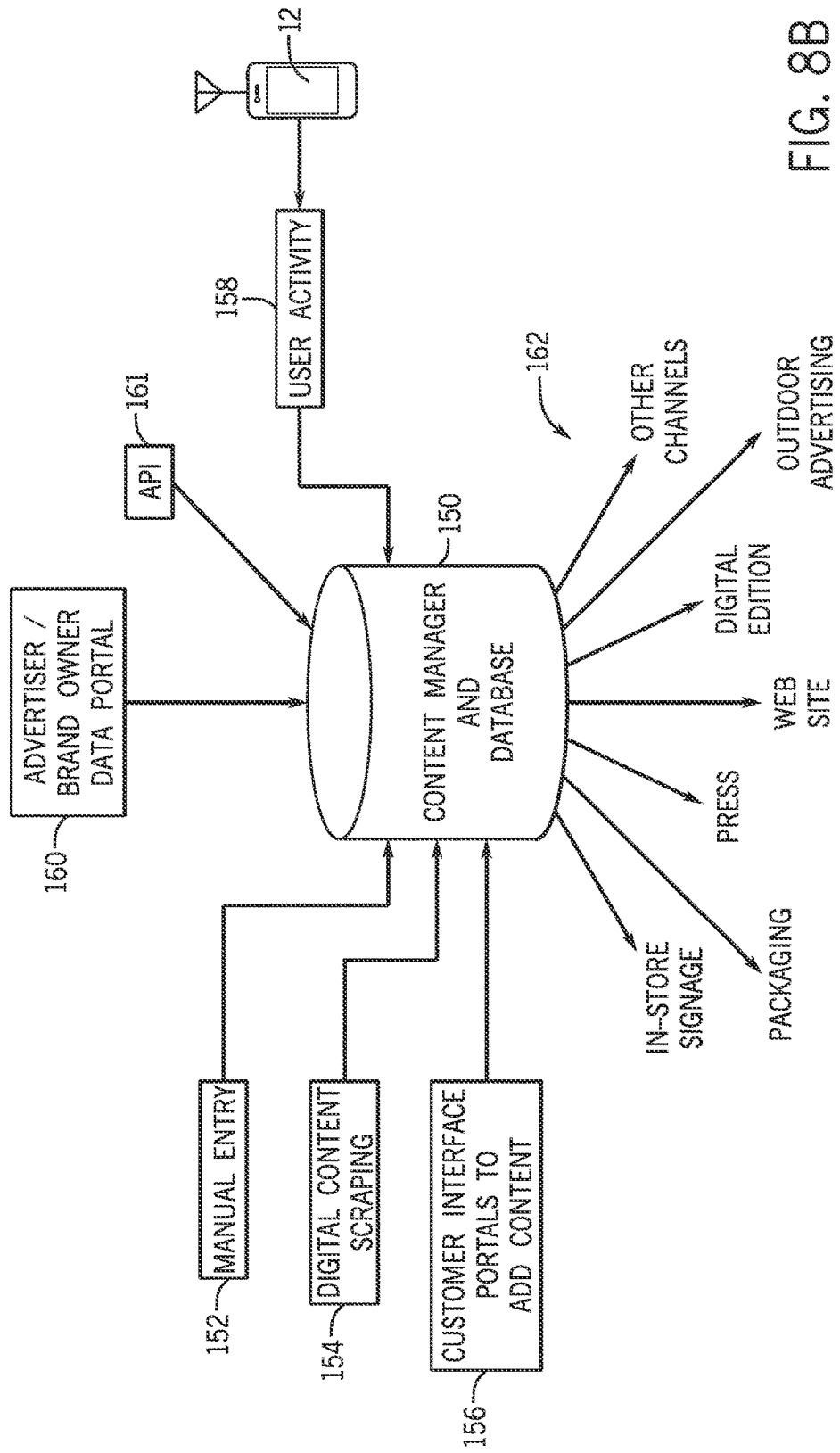
FIG. 8B is a block diagram of a computing system for storing and serving actionable elements, according to one illustrative embodiment.

FIG. 8B is a block diagram of a computing system for storing and serving actionable elements, according to one illustrative embodiment. A content manager and database system 150 is a computing system configured to build an infrastructure of actionable elements related to different printed items. System 150 comprises one or more network interface circuits configured to facilitate communication with other computers over networks, such as the Internet. System 150 comprises a memory configured to store identifying information (e.g., IDs, codes, data, image data elements for image recognition, etc.) for a plurality of different printed items to be printed for different customers. The identifying information may be any type of data or code configured to uniquely identify a printed item or items. In this illustrative embodiment, system 150 may be maintained by a printing company, software services company, or other entity. These entities may serve single customers or a plurality of different customers, such as magazine publishers, packaging manufacturers, advertisers, etc.

System 150 may be configured to receive, for each printed item, a selection of a discovery mechanism for discovering the printed item from a plurality of different discovery mechanisms and at least one actionable element.

The selections may be input manually into the database by the entity operating system 150 on behalf of its customers, as indicated by manual entry block 152. For example, text entry may be used. Alternatively, or in addition, the selections may be input via a customer interface portal 156, which comprises a web site accessible with secure credentials by a customer to input its own data for its own printed items. The selection of a discovery mechanism can be by way of a checklist presented to the user (e.g., "_QR code, _image recognition, and/or _RFID tag"), by allowing the user to graphically select and place a launch point on the printed item, or by other methods.

System 150 may also be configured to receive selections of actionable elements providing access to content or functionality supplemental to content printed on the printed item. The supplemental content may be hyperlinks, augmented reality files, video files, audio files, image files, charts or graphs, links to web pages, etc. The selections of actionable elements may be received via manual entry 152, via customer interface portal 156, etc. System 150 may be configured to associate content with the printed publication, and store the content in a memory.

In another example, a digital content scraping system 154 can be used to scan or read an image file showing the printed item, to identify potentially actionable elements in the image file, and to remove or scrape those items from the image and store them in memory. For example, the pages of a magazine may each be read to identify any URLs, phone numbers, addresses, social media icons, or other recognizable text or images, to provide a list of data items that can be used to generate actionable elements. Optical character recognition, or any other reading or scraping technologies may be used. A customer or other person may review the list of scraped items, edit, and store the edited contents in memory.

In another example, a publisher may use customer interface portal 156 to upload a structured spreadsheet document (e.g., Microsoft Excel, etc.) containing hyperlinks or other supplemental content.

In another example, a publisher may use an advertisement portal, such as an ad portal used to insert advertisements to the print process through a separate data stream than the images for the pages to be printed, to upload supplemental content. Supplemental content may loaded into system 150 through this portal. In one example, an advertising agency may upload an advertisement to be printed in a plurality of different publications, In this case, the supplemental content can be uploaded once and linked to the multiple different publications. In one embodiment, the supplemental content can be overlaid with different brand creative base on the printed publication that is to carry the printed version of the supplemental content.

In another example, a web feed format, such as an RSS feed, may be used to update the supplemental content. API 161 may provide yet further access to database 160 by way of one or more application programming interfaces accessible by other entities.

In another example, geolocation, or ZIP-code and USPS carrier route data can be used to add discovery element links.

System 150 is configured to store the selection of the discovery mechanism and the actionable element or elements in the memory in association with the ID for each of the plurality of different printed items to be printed for different customers.

A user activity block 158 is a processing circuit or part of a computing system configured to record activity a user performs with device 12. A user may be given an option of having some of the user's activity recorded, for example by an "opt in" or "opt out" screen displayed on device 12. If the user does opt to have activity recorded, any user interactions with an actionable element described herein may be recorded. An amount of time a user spends reviewing certain items may also be recorded. A user may store a user profile on device 12 comprising areas of interest (e.g., golf, swimming, sports, etc.), name, location, home location, work location, whether a user is a standard customer or preferred customer for a particular retailer, customer loyalty codes or numbers, coupon codes, or other information the user feels comfortable sharing with system 150.

In one example, system 150 may be configured to select a particular actionable element or set of items for a user based at least in part on the user interaction data and/or personalized data for the user. One example is to select a particular version of a set of actionable elements based on a version of a printed publication. Versioning occurs, for example, when similar publications are printed in multiple versions, each version having content specific to a group or person based at least in part on segmented data or personal data. Segmented data generally refers to data dividing groups of individuals into segments that share similar characteristics, needs or preferences. As an example, data may be segmented by demographic or geographic information. Demographic information may refer to the statistical characteristics of a population. Commonly used demographic characteristics may include age, abilities, mobility, home ownership, employment status, income, education level, occupation, marital status, parental status, and other similar types of data that could be used to characterize a population. Geographic information may include information characterized by the physical location of the customer or other data source. Commonly used geographic characteristics may include geopolitical information (e.g., nation, state, region, county, city, or neighborhood), postal information (e.g., zip code-based information), global positioning information, etc. In addition to market segmentation, versions of a publication may be based upon personal data or attributes such as the characteristics of an individual as opposed to a population of people. Characteristics that could be used for personal data or attributes can include name, behavior, age, etc., but also could include a number of characteristics shared with demographic and geographic information.

System 150 may be configured to receive personalized data for a user e.g., user interaction data, user profile data, segment data, version data, etc.) and to retrieve the actionable elements based further on the personalized data for the user. The personalized data may comprise historical user interface data, the historical user interface data representing previous interactions between a user and a user's mobile computing device, The historical user interface data may comprise user selections of actionable elements displayed on the mobile computing device.

In one embodiment, system 150 may be configured to arrange the actionable elements based on the personalized data for the user. For example, actionable elements in a same or similar category to a user's interest, as stored in a user profile, may be placed first in a list of actionable elements on a page. The selections and arrangements described herein may alternatively be implemented on device 12.

In another embodiment, a context aware platform provided by a third party, such as Gimbal's platform, Qualcomm Labs, Inc., may be used to provide personalized data for users that can be used to trigger, generate, update or modify supplemental content or actionable elements.

In another example, system 150 may be configured to make available to customer portal 156 user interaction data relating to the printed items associated with that customer, for example in the form of a report, This may allow the customer to evaluate the effectiveness of certain advertisements or other content, based on whether a user interacts with the content (e.g., an augmented reality item, hyperlink, etc.), how long or how extensively a user interacts with the content, whether a user makes a purchase of an item using an actionable element, etc. Access may be provided securely to different customers (e.g., via username/password or other credentials) to maintain confidentiality.

An advertiser/brand owner block 160 represents access to system 150 by an advertiser or brand owner. An advertiser may provide actionable elements or updates to actionable elements stored in system 150, for example, to reflect sales, sale dates, inventory of products, replacement products for products that are sold out, IDs of customers who are preferred customers e.g., pricing categories for customers or by location or other segment), etc. System 150 may be configured to select, edit, or update actionable elements received via blocks 152, 154 or 156 based on this additional information received from block 160. Block 160 may represent a secure web portal accessible by advertisers, brand owners, ad agencies, or other entities.

Channels 162 represent the different channels of media from which users can access the information in system 150 or to which the system can deliver information associated with printed items or objects. Any or all data in system 150 can be used by a printer for printing in-store signage, point of sate signage, or packaging materials, by a press operator for printing publications, by a web site operator for presenting and updating product offerings and content, by a digital publisher for publishing a digital edition of a magazine or other publication, by an outdoor advertising agency for publishing outdoor advertisements, or for use in other media channels, Select data elements can be requested from system 150, without the need to download an entire preassembled page with all of its collective links and other supplemental content. This may allow content owners or providers to make content available for use in multiple channels without having to use separate workflows. This may also allow them to create content for different segmented markets without having to use separate workflows.

The various data feeds into system 150 may be static or dynamic. Static feeds may include data being entered manually, for example. Dynamic feeds may include data being continuously or periodically updated as it is acquired, typically without requiring manual user input for each data element.

FIG. 9 is an illustration of a data structure stored in a memory implementing a publication information database 118, the data structure configured to include an electronic document 200 related to a printed publication and associated content, according to an illustrative embodiment. The form and content of the database may be varied to customize the functionality described herein.

An electronic document 200 may be configured to include a plurality of signatures 202 and/or digital images 204 representative of signatures 202. In a printed publication, a signature is a large sheet printed with multiple pages that when folded becomes a section of the printed publication 100. Accordingly, each signature may be associated with multiple signature content sections 206 in the electronic document 200.

Signature content sections 206 define a page structure that is the architecture and building blocks of the printed publication 100. Content sections 206 may further be subdivided based on the content in any particular signature content section, such as by specific articles, images, advertisements, etc.

A signature content section 206 can include information 208 about the discovery mechanism used by a system to correlate the content in the printed publication with a particular signature content section 206. For example, identification information 208 can include a listing of displayed bar codes, an image for image matching, etc.

Signature content sections 206 can further include content detail information 210 that includes page structure information including the design and layout of individual pages and how those pages are arranged and coordinated in the complete printed publication. Page structure also can include taxonomy and tagging of the printed publications and their associated pages and content. Examples of page structure can include primary information about the printed media itself, such as publisher, title, issue and version information. Page structure also can include page and content information, such as one or more of the following: page number and layout type, whether the page or content relates to editorial or advertisement, whether the page or content is image or text, the orientation and/or location information of the page and content, image information such as SKU, date, digital rights management, author, owner, caption, and color data, text information such as storyline, transactional information including price, volume, size, code, etc. information, any links to web or file destinations, extra or associated data feeds. In one embodiment, structure section 206 or portions thereof may be used to tie content information to the particular content in the printed publication 100 in which it is published. Table 1 below provides an exemplary listing of page structure information.

tronic document. Added detail information can include adding hyperlinks to content sections, adding rich media, adding statistical information such as number of times a hyperlink is accessed, how users are using the launch point (frequency, click-throughs, purchases based on launch points, etc.), the correlation between launch points and accessed associated content, etc.

In another embodiment, a data structure for storing print item IDs and actionable elements may comprise one or more of the following, in this or a different order: print; structure; publication; title; issue; version; signature; page; content or sub-content item; actionable element. The content may be, for example, an advertisement, editorial, product description, etc. The content may be, for example, an image, a graph, a chart, a logo, etc.

Figure 10:
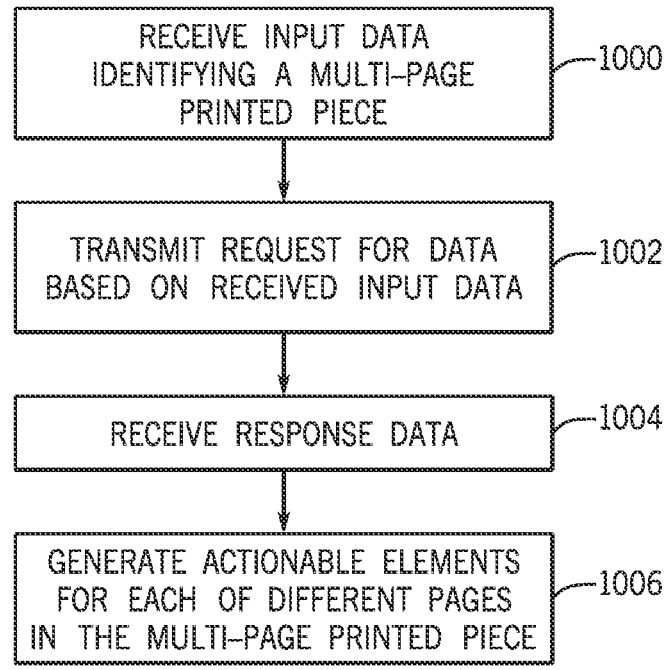
FIG. 10 is a flowchart of a method for processing actionable elements related to a multi-page printed piece, according to one illustrative embodiment.

FIG. 10 is a flowchart of a method for processing actionable elements related to a multi-page printed piece, according to one illustrative embodiment. At a block 1000, an input

| Printed Media Information | Page and Content Information |
|---|---|
| Publisher Information (CRM information such as name, address, historical information, market type, etc.), Title Information (name of printed publication) | Page (number and layout type) |
| Issue (volume no, date, season, etc.) | Editorial |
| Version Information (demographic, geographic, or other segmented type) | Advertisement |
| | Video Information |
| | Image Information |
| | location on the page |
| | orientation |
| | image information (SKU(s) for product on the page, Date product or sale is good for, digital rights management (DRM), Author, Owner, Caption, Color, Links, Ad or Editorial) |
| | Text information |
| | location |
| | orientation |
| | description (storyline, transactional information) |
| | Extra/Associated data feeds (may add in extra data to images- typically associated with opt-in experience such as special offers, promos, video, additional info, augment reality events, Web and File Links |

Signature content section 206 may be associated with content variants 212. A content variant 212 is a variant of a digital signature having a variation to at least some of the content associated with the section 206. Content variant 212 may include a regional variant 214 to customize the content in the content section based on geographic information and/or a segment variant 216 to customize the content in the content section based on segment information.

Electronic documents 200 or digital elements associated with the documents may be automatically generated during a printing process for the printed publication 100. Each signature may be initially generated by capturing digital images or .pdfs during the printing process to form the signature 202 and content section 204. Further, as different versions of a printed publication are printed, image processing software can be configured to detect variations for inclusion in content variants 212. Further, the content section may be automatically populated with information associated with the printing run such as print timing information, publisher information, printer information, etc.

Content detail information 210 may be added and/or modified at any time following the generation of the elecdevice is configured to receive input data which identifies the multi-page printed piece. The input device may be a camera, text box on a screen, UM tag, etc. At a block 1002, a transceiver circuit is configured to transmit a request for data based on the received input data. At a block 1004, the transceiver is configured to receive response data, which may take a variety of forms, formats, or protocols. The response data includes data that can be used to provide actionable elements on a screen of the mobile computing device. At a block 1006, a processing circuit coupled to the transceiver circuit is configured to generate, based on the response data, actionable elements for each of a plurality of different pages in the multi-page printed piece for display. The actionable elements are configured to be selectable by a user to retrieve and/or display additional content related to the selected actionable element.

Figure 11:
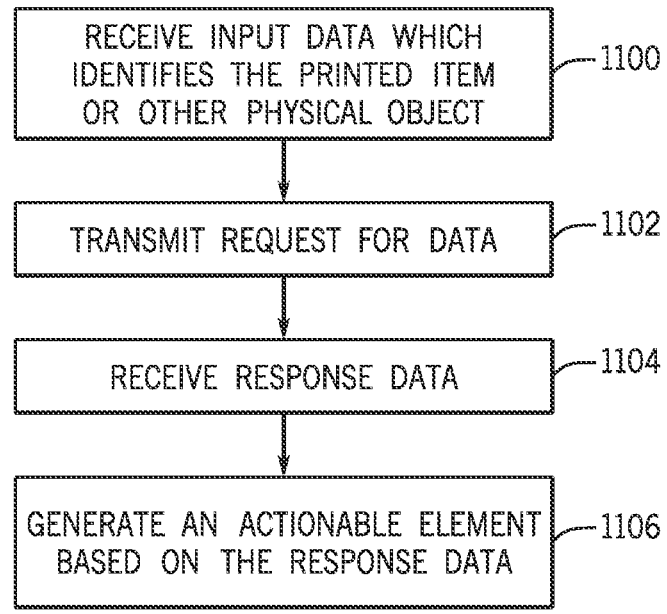
FIG. 11 is a flowchart of a method for processing actionable elements related to a printed item or other physical object, according to one illustrative embodiment.

FIG. 11 is a flowchart of a method for processing actionable elements related to a printed item or other physical object, according to an illustrative embodiment. At a block 1100, an input device is configured to receive input data which identifies the printed item. At a block 1102, a transceiver circuit coupled to the processing circuit is configured to transmit a request for data and (at a block 1104) to receive response data. At a block 1106, a processing circuit coupled to the transceiver circuit is configured to generate, based on the response data, an actionable element previously associated with the printed item for display. The actionable element represents the printed text and is displayed in a format different than a format of the printed text.

The actionable element may relate to the printed text, include portions of the printed text, or otherwise be associated with the printed text. The actionable element, while representing the printed text, may be displayed in a different format, for example, in a different font, with hypertext underlining, separated from a corresponding or underplayed image, or otherwise differently formatted. As another example, the actionable element may be displayed without displaying a full image of the printed item having the printed text. In one embodiment, but not downloading a full image of the printed item (at full resolution, size, and/or scale), communication bandwidth may be reduced.

Figure 12:
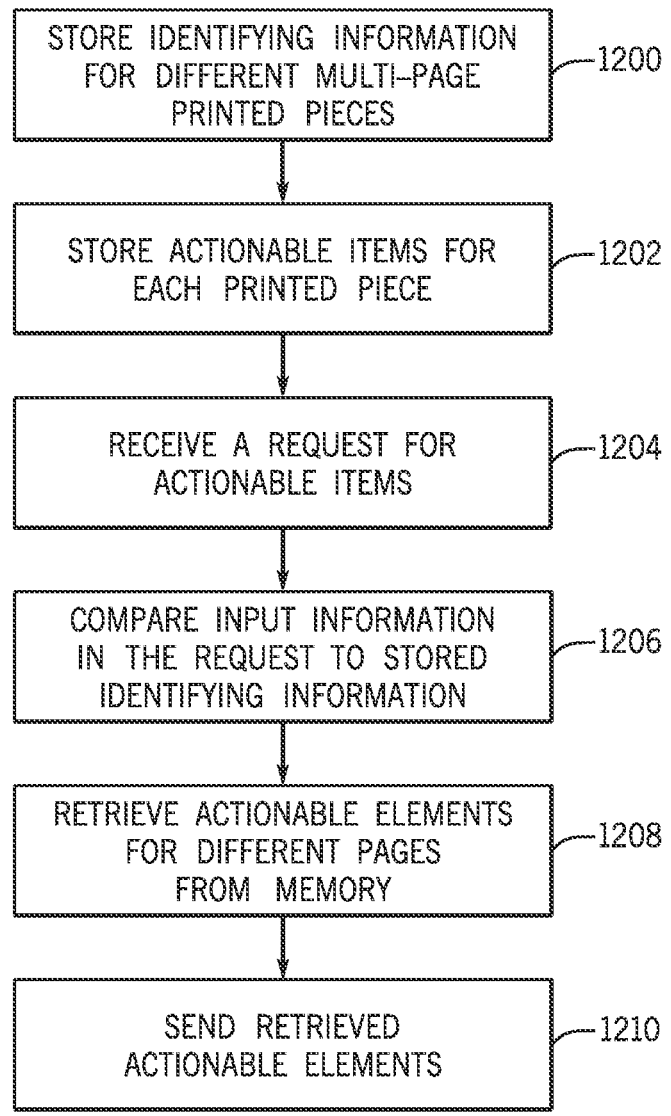
FIG. 12 is a flowchart of a method for processing a request for actionable elements, according to one illustrative embodiment.

FIG. 12 is a flowchart of a method for processing a request for actionable elements, according to an illustrative embodiment. At a block 1200, a memory is configured to identifying information (e.g., IDs, image characteristics, titles, etc.) for a plurality of different multi-page printed pieces. The different multi-page printed pieces may be, for example, a magazine from a first publisher and a magazine from a second, different publisher. At a block 1202, a memory is configured to store associated actionable elements for each printed piece. The actionable elements may be indexed or otherwise associated with the printed pieces in memory. The memory may store the actionable elements indexed by pages in the multi-page printed piece which are pre-associated with the actionable elements. Pre-association may occur at any time before the request for actionable elements is received. Alternatively, association of actionable elements and pages may occur dynamically or "on the fly" or after receiving the request for actionable elements. For example, the system 150 may be configured to select data elements, components, metadata, data files, or other portions of a complete set of data for a printed page or object. These data elements may comprise substantially less memory and bandwidth than the complete set of data, thereby making them more readily downloadable. These data elements may be customizable based on search query data, thereby making them more relevant or pertinent to the particular end user.

At a block 1204, a processing circuit on a server side is configured to receive via a network interface circuit a request for actionable elements for the multi-page printed piece, the request having an ID, The request may come from a mobile computing device, which acquires the ID using a discovery mechanism. At a block 1206, the processing circuit is configured to compare the ID in the request to the IDs stored in the memory. At a block 1208, the processing circuit is configured to retrieve the actionable elements for different pages of the multi-page printed piece from the memory based on the comparison. At a block 1210, the processing circuit is configured to send the retrieved actionable elements via the network interface circuit, back to the requesting device.

Figure 13:
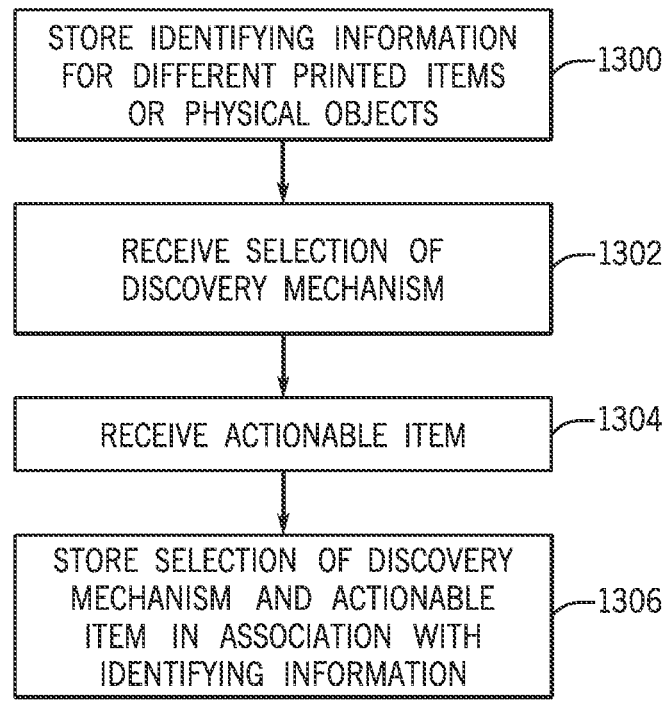
FIG. 13 is a flowchart of a method for building an infrastructure of actionable elements related to different printed items or physical objects, according to one illustrative embodiment.

FIG. 13 is a flowchart of a method for building an infrastructure of actionable elements related to different printed items or physical objects, according to one illustrative embodiment. At a block 1300, a memory is configured to store IDs for a plurality of different printed items to be printed for different customers. At a block 1302, a processing circuit is configured to receive, for each printed item, a selection of a discovery mechanism for discovering the printed item from a plurality of different discovery mechanisms. The discovery mechanism selection may include any of receiving a selection among different discovery technologies, receiving an upload of a bar code, receiving an upload of image recognition data or a selection of an image or portion thereof to be recognized, receiving a selection of a code for use with an RFID tag, or other selection actions. At a block 1304, the processing circuit is configured to receive, for each printed item at least one actionable element, the actionable element providing access to content or functionality supplemental to content printed on the printed item. At a block 1306, the processing circuit is configured to store the selection of the discovery mechanism and the actionable element in the memory in association with the ID for each of the plurality of different printed items to be printed for different customers (e.g., marketers, publishers, etc.).

Figure 14:
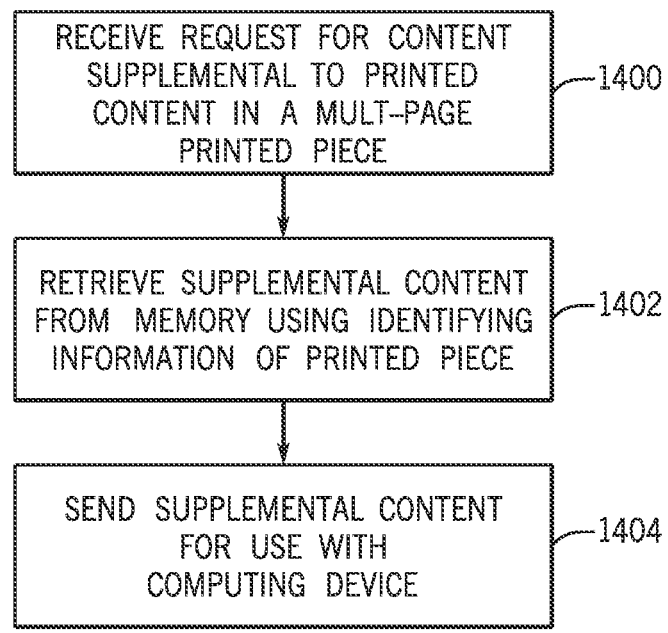
FIG. 14 is a flowchart of a method for processing a request for supplemental content, according to one illustrative embodiment.

FIG. 14 is a flowchart of a method for processing a request for supplemental content, according to an illustrative embodiment. At a block 1400, the method comprises receiving a request for content supplemental to printed content in a multi-page printed piece. The request may comprise a code retrieved from the multi-page printed piece using a discovery mechanism. At a block 1402, the method comprises retrieving from a memory device the supplemental content, wherein the supplemental content comprises different supplemental content items for different pages of the multi-page printed piece. For example, the supplemental content items may comprise at least one of a hyperlink, a phone call item, an augmented reality item and a video item. At a block 1404, the method comprises sending the retrieved supplemental content for use with a mobile computing device.

In an alternative embodiment, the processing circuit is further configured to send an application to the mobile computing device to be used by the mobile computing device to retrieve the code from the multi-page printed piece. The application may be software embodied on a tangible medium, downloadable to the mobile computing device (for example, through an "app store"), or another type of computer application. The application may be configured to perform any of the functions described herein, such as retrieving code from the multi-page printed piece in a discovery process.

Figure 15:
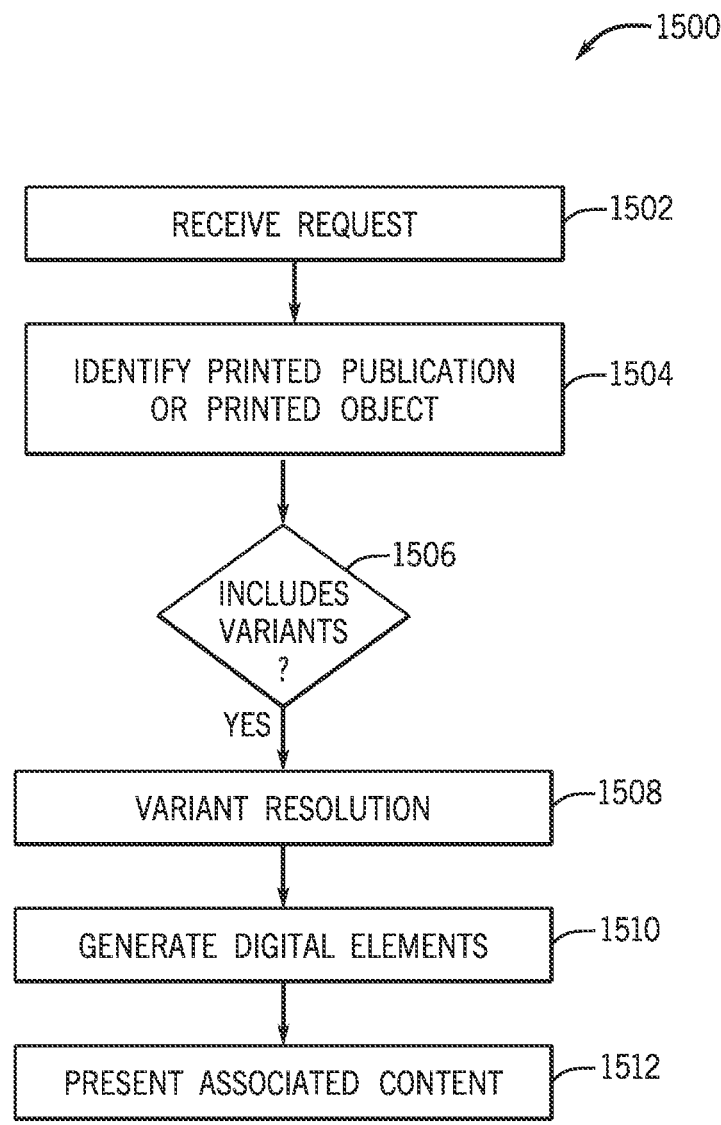
FIG. 15 is a flowchart illustrating a method for generating digital elements associated with a printed piece or physical object based on received variant information, according to one illustrative embodiment.

FIG. 15 is a flowchart illustrating a method for generating digital elements associated with a printed piece or physical object based on received variant information, according to one illustrative embodiment. In one exemplary embodiment, a printed publication identification request, entered using a home screen for example, may be made by an end-user through the use of an end-user device 12 in a block 1502. Regardless of the form of the request or how it is made, the request can be provided by the end-user to a processing circuit, either directly or indirectly. The request can also be provided through a network, such as a phone or data network that can be wired or wireless. Likewise, the request may be received by a server-side processing circuit, either directly or indirectly from the end-user or end-user device, via the network.

Upon receiving the request, the request may be compared to the stored content in database 118 and the information related thereto. As an example, a search of a publication by title will be compared to title information of the stored content. Alternatively, a request coming from a bar code may include publication information (title, version, etc.) that is compared to the same type of information of the stored content. The comparison will result in a list of potential matches, which can be sent to and received by the end-user via the end-user device for confirmation or selection. This may result from a request that does not include enough information to specifically identify a specific printed publication or version thereof. Upon such confirmation or selection, the printed publication 100 and an associated electronic document 200 is identified in a step 1504.

In a step 1506, the processing circuit is configured to determine whether the electronic document or digital elements associated with the printed piece include any content variants. If so, in a step 1506, the processing circuit is configured to determine the nature of the variants and to determine available variant resolution information. For example, where the electronic document is a clothing catalog that includes a. regional variant for northern states and a regional variant for southern states, the processing circuit may be configured to attempt to obtain additional information regarding the source of the request received in step 1502. Steps may include accessing stored information regarding the device 12 or a user of device 12, utilizing GPS functionality of the device 12, etc. Variant resolution in step 1508 may also include displaying the variants for selection by the user, Variant resolution in step 1508 allows information from device 12 and/or end user opt-in identification to be used to generate customized publication augmentation information. This provides a flexible and diverse method of publication content discovery for the end user to enhance the print viewing experience.

Advantageously, information available through device 12, a user profile associated with device 12, and information associated with the printed publication itself can be used to facilitate variant resolution. Information available through device 12 can include a device location, a device type, a device model, device usage statistics, etc. The user profile may be provided by the user and/or may be culled from existing information sources. Publication information for the printed publication may include identifying the variant of the printed publication, identifier of a subscriber or purchaser of the printed publication, etc. The variant of the electronic document may be different from a variant of the printed publication depending on the inputs used in step 1508. The user profile may include user-set preferences. For example, if the user is using a device that is not well suited for a telephone call, the user can request that any phone call actionable elements not be presented on its screen.

Advantageously, generating an electronic document during the printing of a printed publication may allow the system to utilize the same or a similar set of data structures and workflows from the printed publication to deliver/distribute a multi-channel experience (print and digital) through the electronic document. This efficiency may reduce problems of double submissions and workflows which cause delay, higher incidence of error, reduced labor requirements, etc.

Following resolution of the variants in step 1508, a customized representation of the electronic document may be presented to the user of device 12 in step 1510. Generating a customized electronic document may include stitching together the signatures including content to generate a digital version of the printed publication at the time of the request 1508 based on variant information that is available also at the time of the request.

Presenting the customized electronic document in step 1510 can further include displaying content associated with the generated version of printed publication in a step 1512. The displayed content linked to printed media may represent anything that can be displayed on the mobile device: URLs, phone numbers, email addresses, video, audio, etc.

The method of flowchart 1500 can be used to display the printed media and linked content from a single end-user request submission. For example, the single end-user request submission could be generated by manually searching, using the device to conduct imaging or image recognition within that publication, scanning a barcode such as a UPC code or QR code, interaction with a tag such as a Near Field Communication (NFC) tag, or other means. The launch point used to generate the request no longer needs to correlate to individual pages or content links (though it may in alternative embodiments), but instead may correlate to the entire printed media piece or groups of related pages and content within the printed media piece. The launch point now may provide a proxy for use in print media marketing based on single images or ads. For example, the launch point may be used as a catalog proxy for the entire catalog, a launch point on an item as a proxy to a complete catalog and so on.

Advantageously, the method of flowchart 1500 provides a system that has the ability to pull separate image/page files in real time to build (or stitch) a version of a publication at the time of a request as opposed to grabbing a single file of the complete publication. This process gives an advantage of reducing prep and handling time and also reduces the amount of data to be stored (i.e., no need to store multiple complete variants), especially as it relates to publications with numerous versions.

Figure 16:
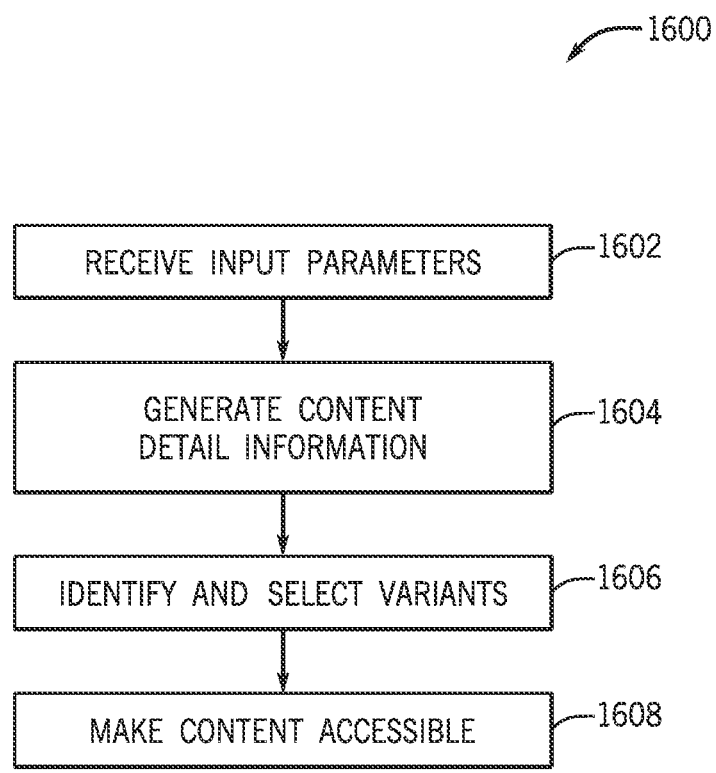
FIG. 16 is a flowchart illustrating a method for generating digital elements associated with a printed piece or physical object based upon variant information, according to an illustrative embodiment.

FIG. 16 is a flowchart illustrating a method for generating digital elements associated with a printed piece or physical object based upon variant information, according to an illustrative embodiment. The method of flowchart 1600 includes the process of pulling together separate images, or pages, or links for mobile content from database 118 in real-time at the time the user accesses the publication. This content can be based on personalized data, like either the demographic or geographic attributes of the user accessing the work as described above.

In a step 1602, system 150 receives input parameters related to the printed publication and the end user. Input Parameters may be any one or combination of the known print parameters—title, publication or in-home date, page and advertising version information, page sequence, mail address or newsstand location, personalization, etc.—and mobile devices parameters—smartphone or tablet type, geo-location, user opt-in selection, method of discovery applied, etc. Geographical location for print media may be determined by the final physical destination, be it the postal address or newsstand regional location. The print postal zip code, carrier route, and newsstand location information may be used to correlate to mobile device end user interaction, geo-location, and opt-in profile. Device characteristics may include, for example, whether a device supports web browsing, multi-media support such as video and audio, and whether a device supports autonomous applications. The device, along with the stitched together and downloaded information and Internet links, can provide an augmented content experience that serves as a companion to print media. User characteristics may include characters of those individuals and publishers who wish to have or provide an enhanced print media experience. Users reading a print media piece may use their mobile device to interact with content and information called-out and/or linked within the print. Once a user has accessed a publication version, they can scroll to or activate any page or link within the publication.

Based on the received input parameters, the system 150 can generate a listing of content detail information in a step 1604. The content detail information can include associated content from the electronic document or supplemental content defined based on the structure of the printed publication. The content from the electronic document may be defined based on the structure of the printed publication because of the method used to generate the electronic document, described above. Following structure definition, content may be associated with the content of the electronic document without modifying the underlying structure.

In a step 1606, the processing circuit on the server or device side can be used to identify and select content variants based on the device information, printed publication information, and user information received in step 1602. Selection of content variants may include selection of associated content rather than selection of the content in the printed publication.

In a step 1608, device 12 can be configured to access an associated content listing, similar to the listing shown and described above with reference to FIGS. 5 and 6. The listing of associated content can include a photograph of the content from the printed publication along with additional functionality such as a web link, a hyperlink, mapping functionality, etc.

Access to the content may be in the form of a digital reproduction of the specific version of the printed publication, a customized version of the publication based upon the segmented information known about the end user, or otherwise providing linking or interactivity with the content from the printed publication. This may be through a URL, web page, or other digital destination or content, including GPS, content information, invitation for electronic or digital communications, etc. The end users also may desirably distribute or share the content from the printed publication with other users. Access to the content may be obtained through the display, through an audio output circuit, through haptic feedback, etc.

Figure 17:
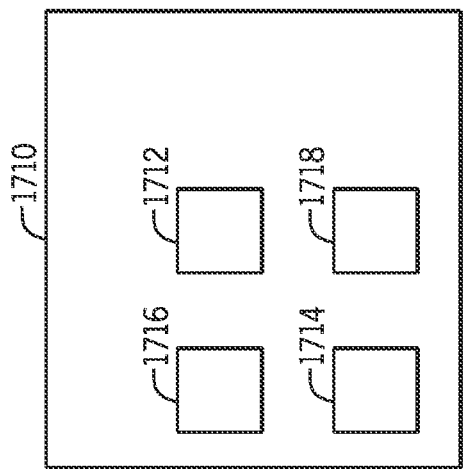
FIG. 17 is a computer implemented augmentation system for presenting digital information related to the content of a printed piece or an object based on received information identifying the printed piece or object, according to one illustrative embodiment.

FIG. 17 is a computer implemented augmentation system for presenting digital information related to the contents of a printed piece or object based on received information identifying the printed piece or object, according to an illustrative embodiment. The description of the components below may apply to other components shown or described in other embodiments presented herein.

Augmentation system 1710 includes an information processor 1712, one or more identification input devices 1714, a user interface 1716, and a memory 1718. Although system 1710 is shown as including a single system including specific components associated with specific function, it should be understood that the functionality described herein may be performed using multiple systems and more, fewer and/or a different arrangement of components, and that functionality described as being performed by any specific component may alternatively be performed by any other component.

The functional components of system 1710 are implemented using hardware including a processing circuit implementing the information processor 1712, a system memory 1718 for storing instructions for implementing the information processor 1712, and a system bus that couples various system components, including the system memory, to the processing circuit. Further, the described components may be implemented using hardware and/or software embodied on a tangible medium.

The processing circuit may comprise or be a portion of any type of computer processor comprising suitable analog and/or digital circuit components, such as a microprocessor, microcontroller, application-specific integrated circuit, programmable logic, etc., configured to implement the functionality described herein. The processor also may be local or network based.

The system memory may include computer storage media in the form of volatile and/or nonvolatile memory such as read only memory (ROM) and/or random access memory (RAM). System 1710 may also include other removable/non- removable, volatile/nonvolatile computer storage media, such as a local or cloud-based drive including the information database 1718.

Information processor 1712 may comprise software embodied on a computer-readable medium (such as firmware, memory, a CD-ROM, etc.) and implemented by a processing circuit configured to determine an identification of a printed piece or object and to provide information to the user interface 1716 to augment the information in the printed piece or object. Specifically, in one embodiment the processor 1712 may be configured to receive input from an input device 1714 to allow processor 1712 to identify a printed piece 10 and optionally a page in the printed piece. Based on the identified page and/or printed piece, processor 1712 may be configured to retrieve augmentation information from the memory 1718 for the user interface 1716. The augmentation information can include digital elements associated with the printed piece or object, and may include an electronic copy of the printed piece or descriptions of the content within the printed piece, text, graphics, etc., that are customized to the device 1710 user of device 1710 and/or augmented content accessed in context based on the identified page.

Input device 1714 can include any type of input device or method for receiving information or an identification of a printed piece or object. Examples can include, but are not limited to a camera, a transceiver, a microphone, a keyboard including either a physical keyboard. and/or a virtual keyboard implemented using the display 1716, haptic or capacitive screens, radio frequency readers, or other electronic devices and sensors that are configured to interact with a. printed piece or object. The input device 1714 may be embodied in a wearable housing, such as eyeglasses, a wristband, a belt clip, a hat, etc. Input devices 1714 can be configured to operate in combination with software implemented by processor 1712 to perform a number of different recognition or discovery methods. For example, a camera input device 1714 may capture an image of text, graphics and or code within the printed piece or object, and convey that to an image matching circuit implemented by processor 1712. Among other possibilities, a user can use the input device 1714 to recognize a printed piece cover, content within a printed piece, a universal product code or other type of barcode displayed in the printed piece, an ISBN number, radio frequency tag or near field communication tag, text or graphics, etc. to initiate a process for identifying the printed piece. Alternatively, a user can manually enter the name of a printed piece or object using search terms to find the desired printed piece or object.

User interface 1716 can be any type of display configured to display information provided. by processor 1712, such as a liquid crystal display (LCD), an active matrix LCD, an organic light-emitting diode display, or other display types, audio device or speaker, haptic screen, or other interface that can convey information to any one or all of the five senses.

Augmentation system 1710 may be configured to access or display digital elements associated with the piece generated during the printing of the printed publication. The digital elements associated with the document may be augmented or supplemented with additional functionality related to the content contained in the printed publication. The augmentation may be provided by functional blocks overlaid on the display of the electronic document, by displaying a table of contents including available functional content where the table of contents is structured to mirror the content contained in the printed publication, by providing supplemental content may not display information such as an audio file playback, haptic feedback, etc., or any combinations thereof, etc.

According to one embodiment, a computer implemented method for providing digital elements associated with a printed piece or other object comprises: receiving a request from a requester for a digital element associated with the printed piece or object, the request including information to identify the printed piece or object; selecting one or more content variants associated with the printed piece, object or requester of the digital element; generating the digital element to include or be based on the one or more content variants; and sending the digital elements to the requester.

The request may further include content variants such as location data indicating a geographic origin of the request, information about the device or user of the device. Generating a digital element may include assembling the digital elements based on such content variants. Each content variant may be selected based on at least one of the printed piece identification, object information, user information, device information, and request information.

In one embodiment, generating a digital element associated with the printed piece or object may include generating a table of contents based on the selected content variants. The digital elements or representation associated with the printed piece or object may be unique from the printed piece or object itself based on the selected content variants. Ultimately, this allows a user to experience a version of the printed publication or object relevant to that user, and allows brand-owners and content creators to deliver more useful, targeted and personalized messages and offers and calls for action to users.

According to another embodiment, a computer implemented method for providing a representation of—or digital elements associated with—a printed piece or object based on received input data may comprise: receiving identification information related to a printed piece or object; matching the received identification information to a printed piece or object; identifying content associated with the printed piece or object, the content optionally being structured based on the structure of the printed piece or object description; and sending the associated content for use on a user interface. The associated content may be received by and/or downloaded to a computing device; and the associated content may be communicated via the user interface.

The printed piece or object may include one or a plurality of launch points, each launch point being associated with unique associated content. The digital elements associated with these launch points may be configured to include one or more hyperlinks based on the information associated with these launch points. The launch points may comprise a graphic and/or text, such as those found on the cover or page of certain printed pieces. Other launch points may include a radio frequency or near field communication (NFC) tag, a quick response (QR) code, a universal product code (UPC), a barcode, an international standard book number (ISBN), a wireless transmitter, a product shape or distinctive element, etc. The radio frequency, near field communication (NFC), or wireless devices may be active or passive devices. The information obtained through the input device from the launch point is processed to information that can be sent for comparison with information about the launch point, for example through a database look-up table. Once a positive identification of the printed piece or object is made, the digital elements associated with the printed piece or object may be sent to the user interface and/or downloaded.

According to another embodiment, a computer implemented system for providing a customized digital information related to a printed piece or object using a computing device may comprise: one or more input devices for receiving information for identifying a printed piece or object and at least one of a device characteristic, a user characteristic and a printed piece characteristic or object characteristic. An electronic document or a digital element generator implemented by a processor on a computing device may be configured to select one or more content variants associated with the printed piece or object. The content variants may be selected based on one of a device characteristic, a user characteristic, and a printed publication characteristic. The processor may further be configured to generate a digital representation or digital elements of the printed publication to include the plurality of content variants. An electronic display of the computing device may be configured to display the digital representation of the printed piece or object. The device characteristic may include GPS or other location data indicating a request geographic origin. Generating digital information related to the printed piece or object may include assembling a plurality of content variants selected based on the GPS data. Generating digital information related to the printed piece or object may further include generating a table of contents based on one or more of the content variants. The digital information related to the printed piece or object may be unique from the printed publication based on the selected content variants.

While some embodiments are described with reference to printed pieces or printed publications, other embodiments may be used with non-printed objects, such as perhaps a purse or handbag, shaped items such as bottles or containers, items having a distinctive or recognizable feature, or objects that may otherwise be recognizable using a discovery mechanism. The embodiments herein may allow these brand owners or advertisers to deliver additional content such as actionable elements relating to everyday objects to the user.

The invention has been described in terms of several preferred embodiments. It will be appreciated that the invention may otherwise be embodied without departing from the fair scope of the invention.

What is claimed is:

1. A computing system for building an infrastructure of actionable elements related to different printed items, comprising:
    a network interface circuit;
    a memory configured to store identifying information for a plurality of different printed items to be printed for different customers; and
    a processing circuit configured to receive, for each printed item, a selection of a discovery mechanism for discovering the printed item from a plurality of different discovery mechanisms and at least one actionable element, the actionable element providing access to supplemental content which is supplemental to content printed on the printed item, wherein the processing circuit is configured to use a digital content scraping system to read an image file, to identify potentially actionable elements in the image file, and to scrape those items from the image and store them in the memory, wherein the processing circuit is configured to provide the scraped items for review, edit and storage by a user, wherein the processing circuit is configured to store the selection of the discovery mechanism and the actionable element in the memory in association with the identifying information for each of the plurality of different printed items to be printed for different customers, wherein the processing circuit is configured to provide a portal configured to receive the supplemental content for the printed items through a separate data stream than images for pages to be printed for the printed item, wherein the supplemental content is uploaded once and linked to multiple different printed items, wherein the processing circuit is configured to overlay the supplemental content with different brand creatives based on the printed item that is to carry a printed version of the supplemental content.

2. The computing system of claim 1, wherein the processing circuit is configured to generate the actionable element based on text input from a user input device.

3. The computing system of claim 1, wherein the portal is for use by the different customers, wherein the actionable elements are received from the different customers via the portal for the different printed items.

4. The computing system of claim 1, wherein the processing circuit is configured to receive user interaction data based on user interaction with the actionable element.

5. The computing system of claim 4, wherein the processing circuit is configured to send one of a plurality of different actionable elements to a user based at least in part on the user interaction data.

6. The computing system of claim 4, wherein the processing circuit is configured to provide access to user interaction data for different printed items securely to respective customers via user interface portals.

* * * * *